(12) United States Patent
Martinot-Lagarde et al.

(10) Patent No.: US 7,864,148 B2
(45) Date of Patent: Jan. 4, 2011

(54) BISTABLE NEMATIC LIQUID CRYSTAL DISPLAY DEVICE AND METHOD FOR CONTROLLING SUCH A DEVICE

(75) Inventors: Philippe Martinot-Lagarde, Marcoussis (FR); Alain Boissier, Marly le Roi (FR); Jacques Angele, Malakoff (FR); François Leblanc, Paris (FR)

(73) Assignee: Nemoptic, Magny les Hameaux (FR)

( * ) Notice: Subject to any disclaimer, the term of this patent is extended or adjusted under 35 U.S.C. 154(b) by 904 days.

(21) Appl. No.: 10/536,419

(22) PCT Filed: Nov. 24, 2003

(86) PCT No.: PCT/FR03/03460

§ 371 (c)(1),
(2), (4) Date: May 25, 2005

(87) PCT Pub. No.: WO2004/051357

PCT Pub. Date: Jun. 17, 2004

(65) Prior Publication Data

US 2006/0022919 A1     Feb. 2, 2006

(30) Foreign Application Priority Data

Nov. 26, 2002 (FR) .................................. 02 14806

(51) Int. Cl.
*G09G 3/36* (2006.01)
(52) U.S. Cl. .............................. 345/92; 345/87; 345/90
(58) Field of Classification Search .................... 345/55, 345/87, 90, 91, 92
See application file for complete search history.

(56) References Cited

U.S. PATENT DOCUMENTS

| | | | | |
|---|---|---|---|---|
| 5,424,753 A | * | 6/1995 | Kitagawa et al. | 345/94 |
| 5,488,499 A | * | 1/1996 | Tanaka et al. | 349/177 |
| 5,598,284 A | * | 1/1997 | Kogushi et al. | 349/33 |
| 5,917,465 A | * | 6/1999 | Mochizuki et al. | 345/94 |
| 5,977,940 A | * | 11/1999 | Akiyama et al. | 345/90 |
| 6,057,817 A | * | 5/2000 | Ono et al. | 345/94 |

(Continued)

FOREIGN PATENT DOCUMENTS

FR     2740893     11/1996

(Continued)

*Primary Examiner*—My-Chau T Tran
(74) *Attorney, Agent, or Firm*—Foley & Lardner LLP

(57) ABSTRACT

The present invention relates to a display device comprising a bistable nematic liquid-crystal matrix screen with anchoring breaking, characterized in that it comprises:

components (40) capable of switching between an off state and an on state, these components being placed respectively between a drive electrode (47) associated with each pixel and a display state control link (45); and means capable of applying, to the input of each aforementioned component (40), via the state control link (45), input signals comprising at least two phases separated by a controlled time interval, namely a first phase during which the input signal has an amplitude sufficient to permit breaking of the anchoring of the liquid crystal on the associated pixel, then a second phase during which the amplitude of the input signal is controlled in order to select one of the two bistable states of the liquid crystal, the time interval between the two phases being adapted in order to break the anchoring of the liquid crystal on the said associated pixel before the second input signal phase is applied.

13 Claims, 23 Drawing Sheets

U.S. PATENT DOCUMENTS

| | | | |
|---|---|---|---|
| 6,107,980 A * | 8/2000 | Hermanns et al. | 345/90 |
| 6,327,017 B2 | 12/2001 | Barberi et al. | |
| 6,452,573 B1 * | 9/2002 | Martinot-Lagarde et al. | 345/8 |
| 6,590,553 B1 * | 7/2003 | Kimura et al. | 345/92 |
| 6,831,716 B2 | 12/2004 | Dozov et al. | |
| 7,053,975 B2 | 5/2006 | Wood et al. | |
| 7,173,587 B2 * | 2/2007 | Angele et al. | 345/87 |
| 2001/0012080 A1 | 8/2001 | Barberi et al. | |
| 2003/0174266 A1 | 9/2003 | Dozov et al. | |
| 2004/0041761 A1 * | 3/2004 | Sugita et al. | 345/87 |
| 2004/0191427 A1 | 9/2004 | Wood et al. | |

FOREIGN PATENT DOCUMENTS

| | | |
|---|---|---|
| FR | 2808891 | 5/2000 |
| WO | WO-02/08825 | 1/2002 |

* cited by examiner

PRIOR ART

Example of a pixel signal for switching to the T state

PRIOR ART

Example of a pixel signal for switching to the U state

PRIOR ART

**Example of a two-level pixel signal
Texture selection according to the P2 value
of the second level of the pulse applied to the terminals of the pixel**

PRIOR ART

Example of row, column and pixel signals in multiplexed mode
Row signal
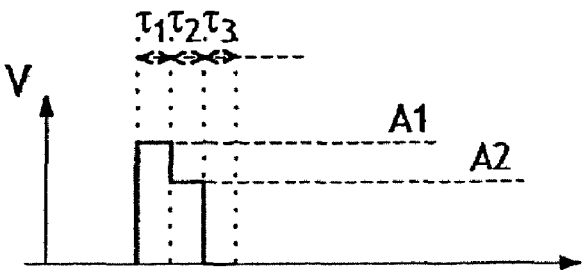
FIG_6a
PRIOR ART
Column signal: switch to U state
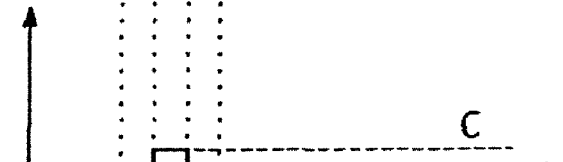
FIG_6b
PRIOR ART
Column signal: switch to T state
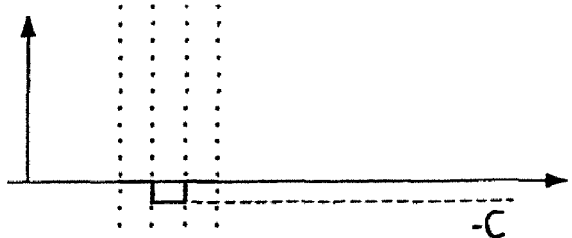
FIG_6c
PRIOR ART
Pixel signal: switch to U state
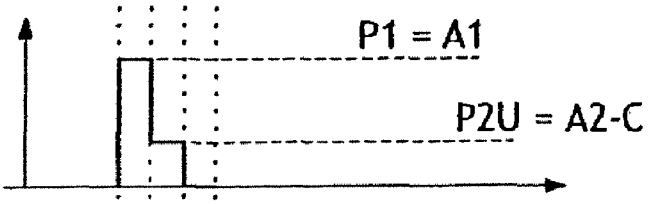
FIG_6d
PRIOR ART
Pixel signal: switch to T state
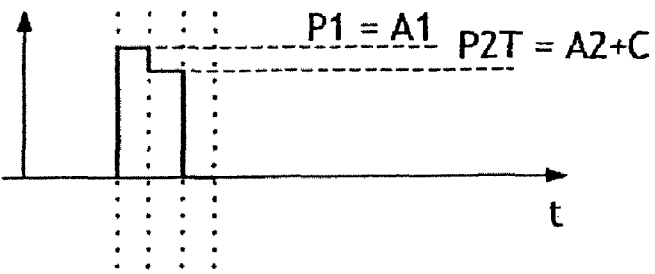
FIG_6e
PRIOR ART

FIG_7
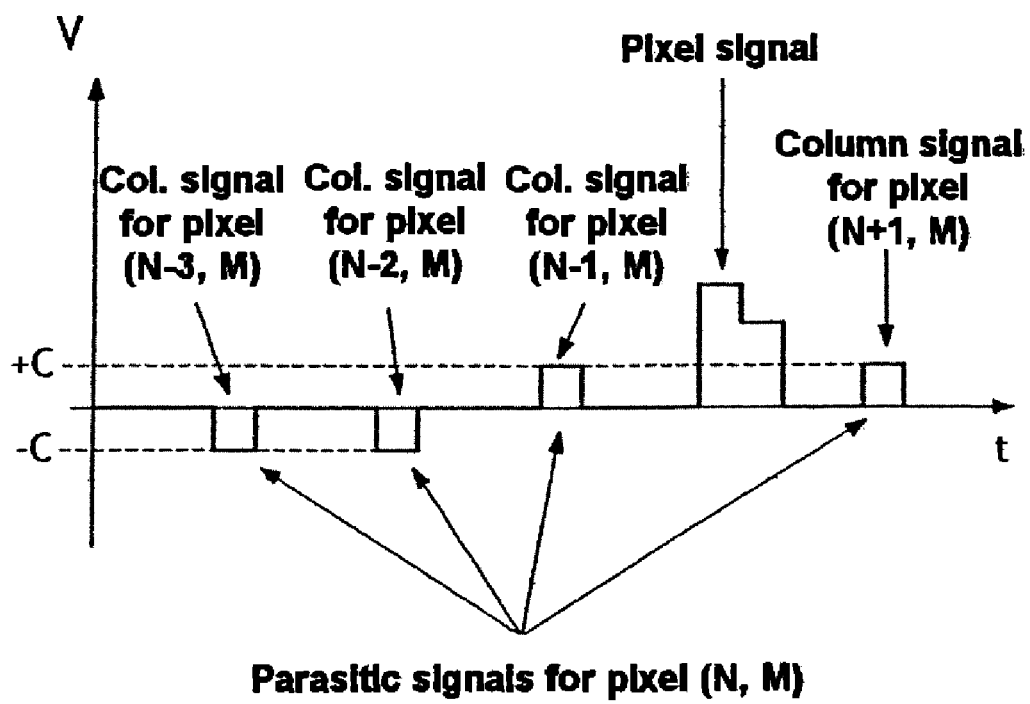
PRIOR ART

Multiplexed display

PRIOR ART

FIG_9
Equivalent circuit diagram for a row
of a multiplexed liquid-crystal display
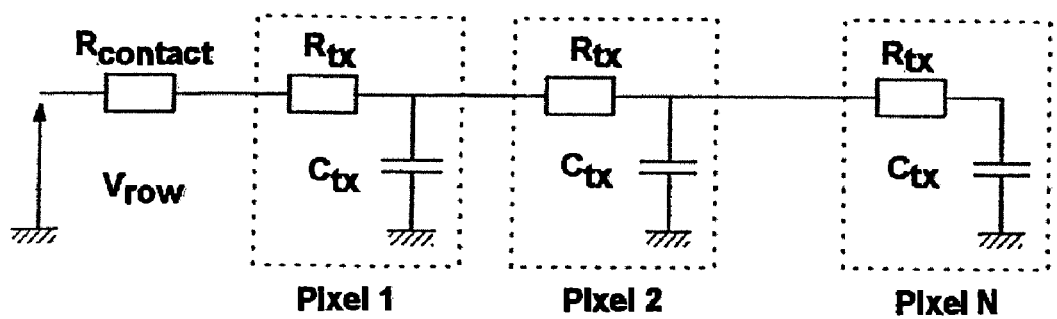
PRIOR ART

Variation in the waveform of the falling edge of the voltage applied to a pixel during propagation along a row
PRIOR ART FIG_10a
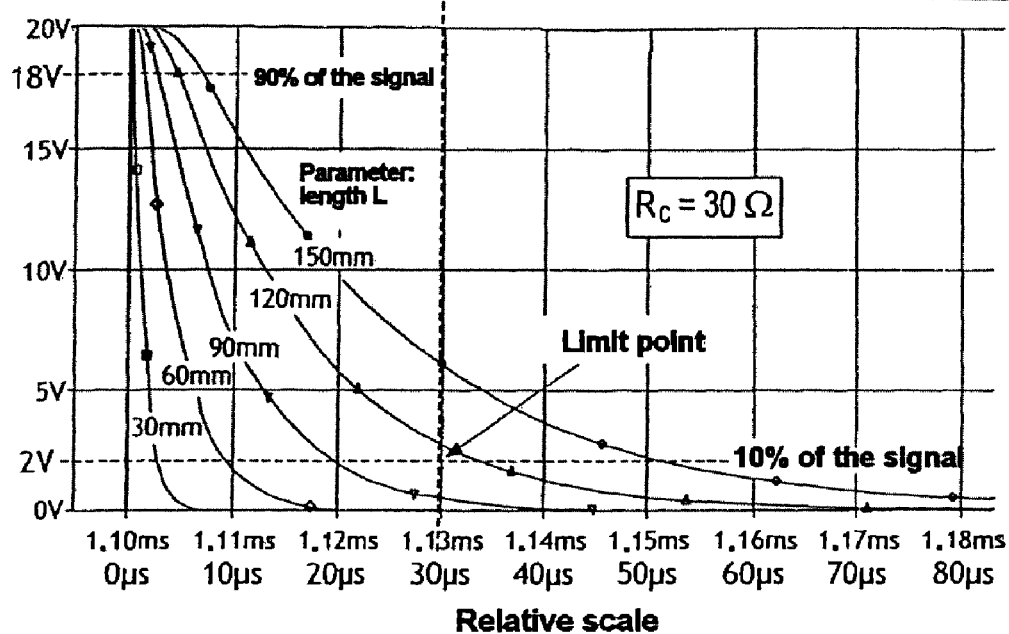
PRIOR ART FIG_10b
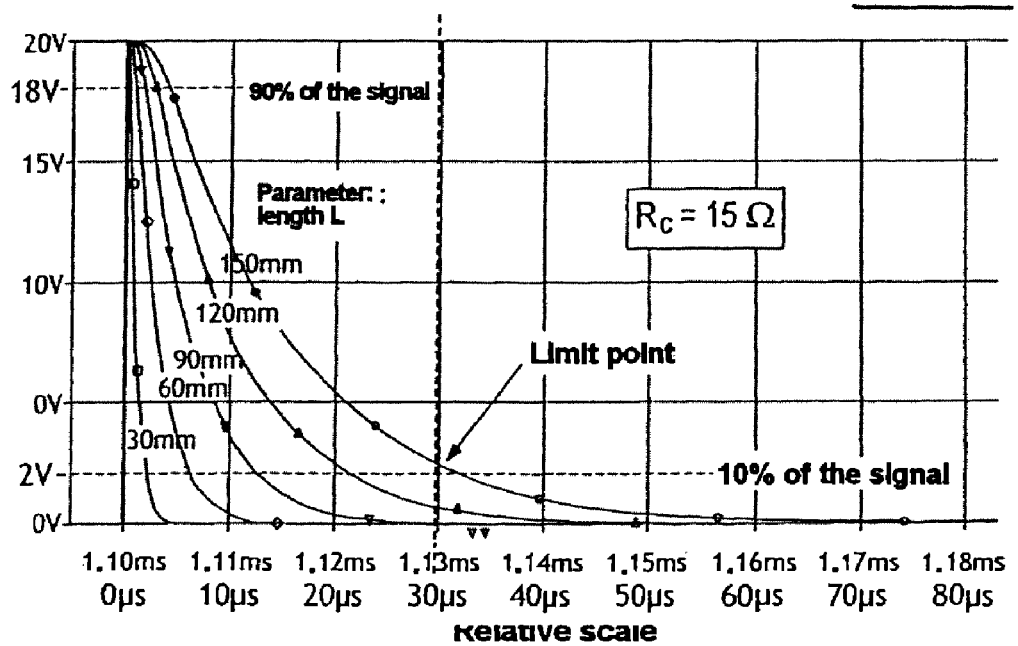

FIG_11
Principle of active addressing
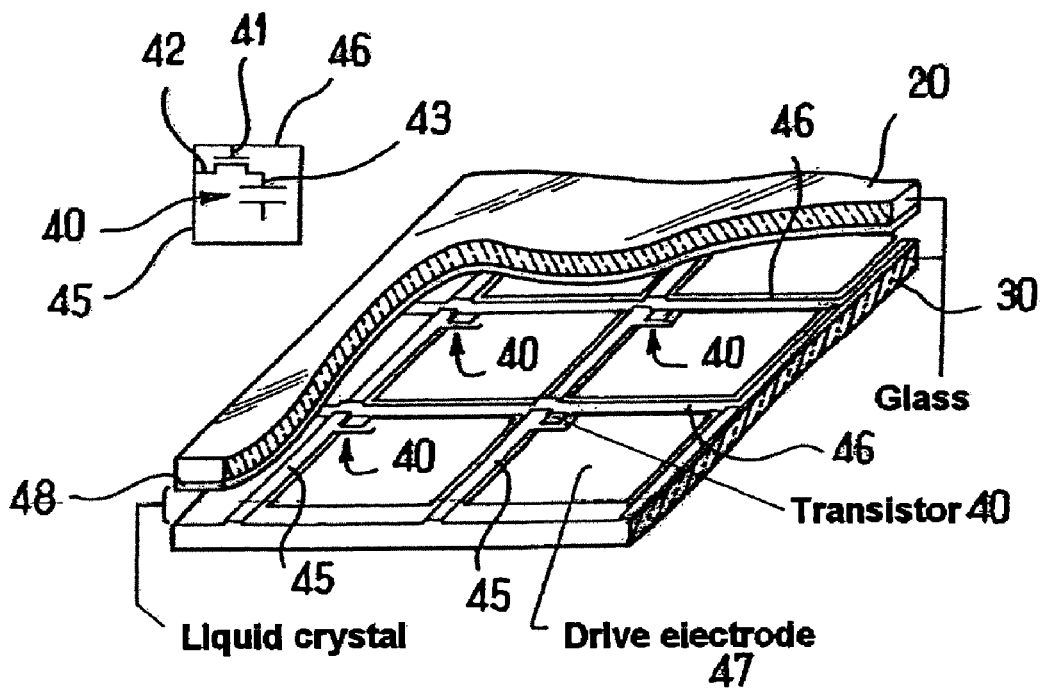
PRIOR ART

Equivalent circuit diagram for a liquid-crystal pixel addressed by a TFT transistor on transistor off

PRIOR ART

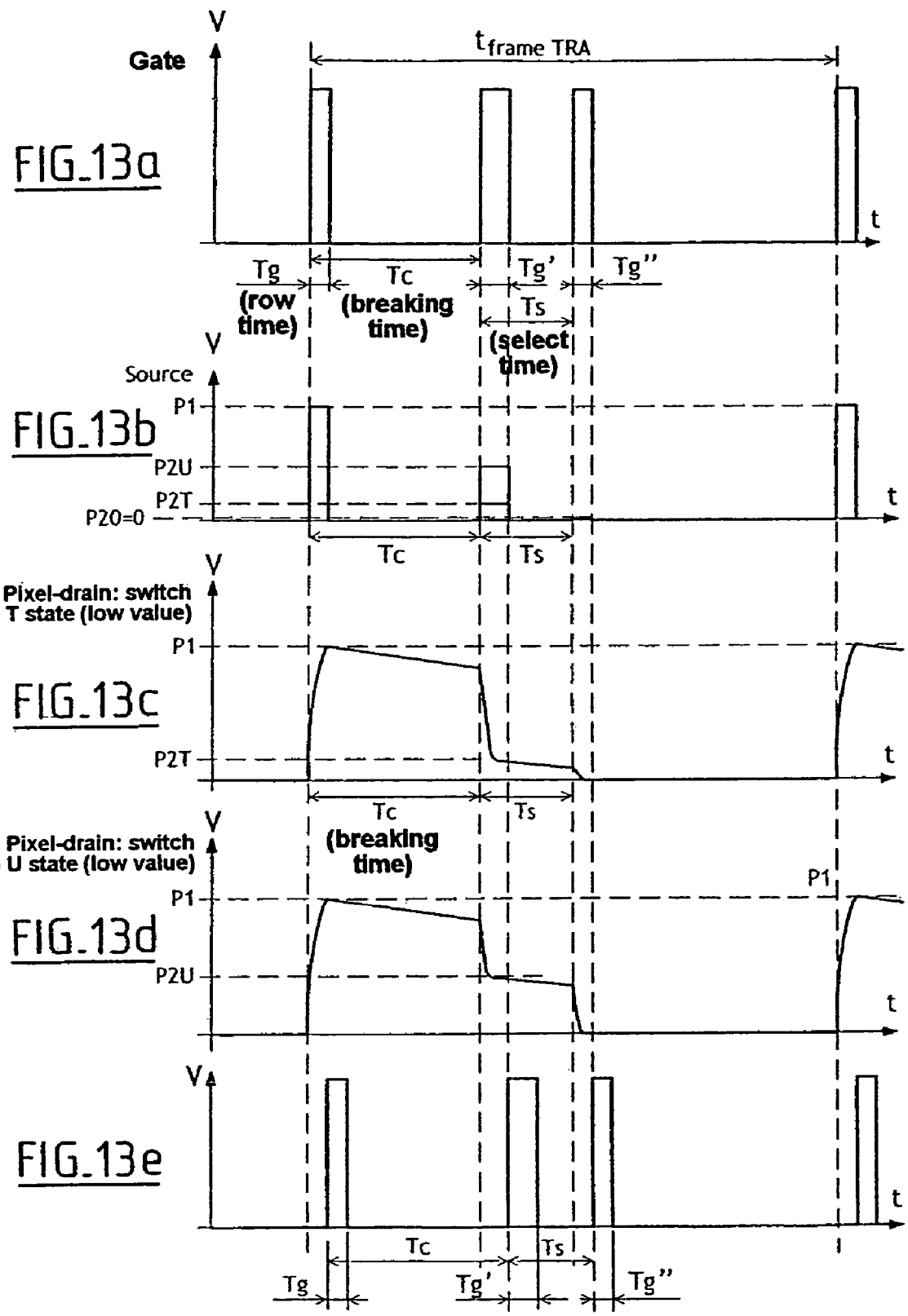

FIG_14
Equivalent circuit diagram for a liquid-crystal pixel of the BiNem type addressed by a TFT suitable for 2-fold addressing
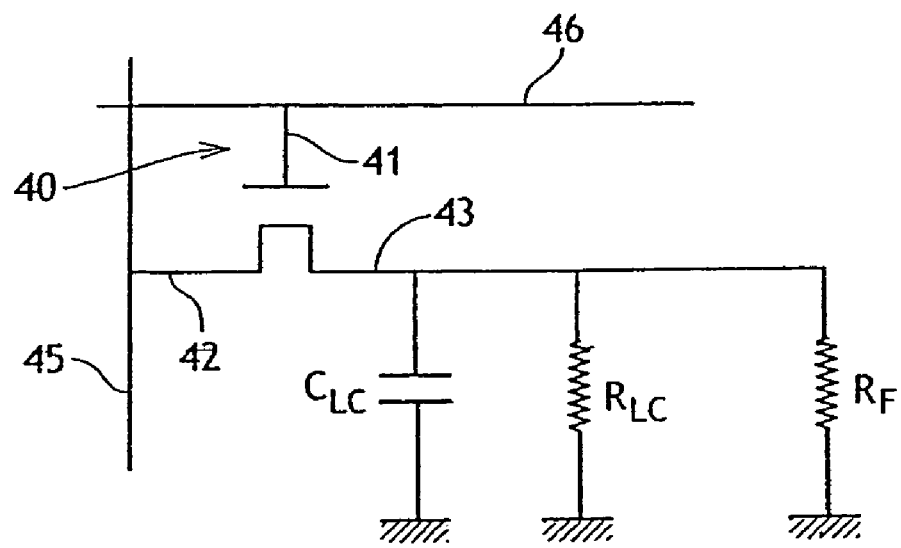

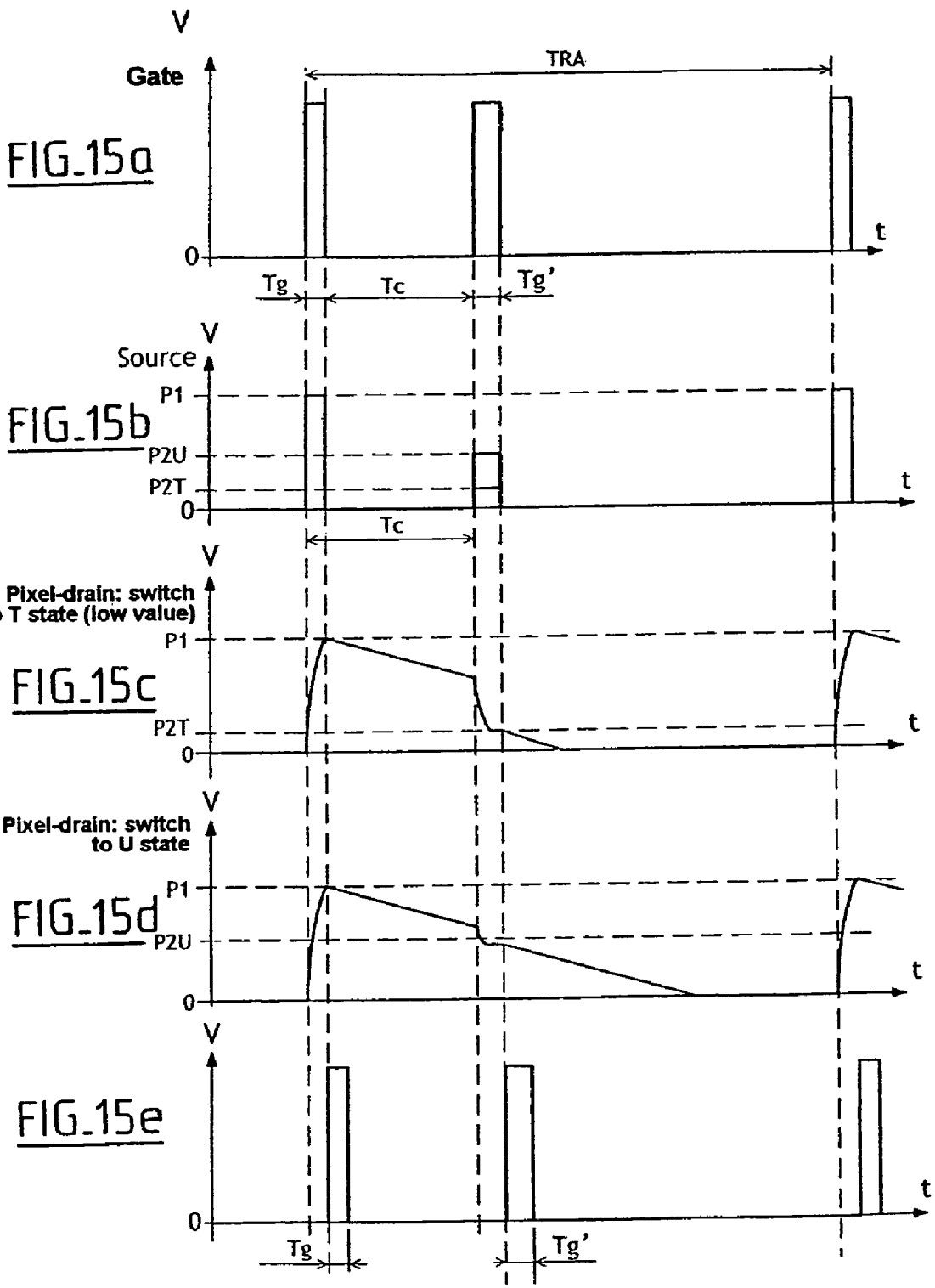

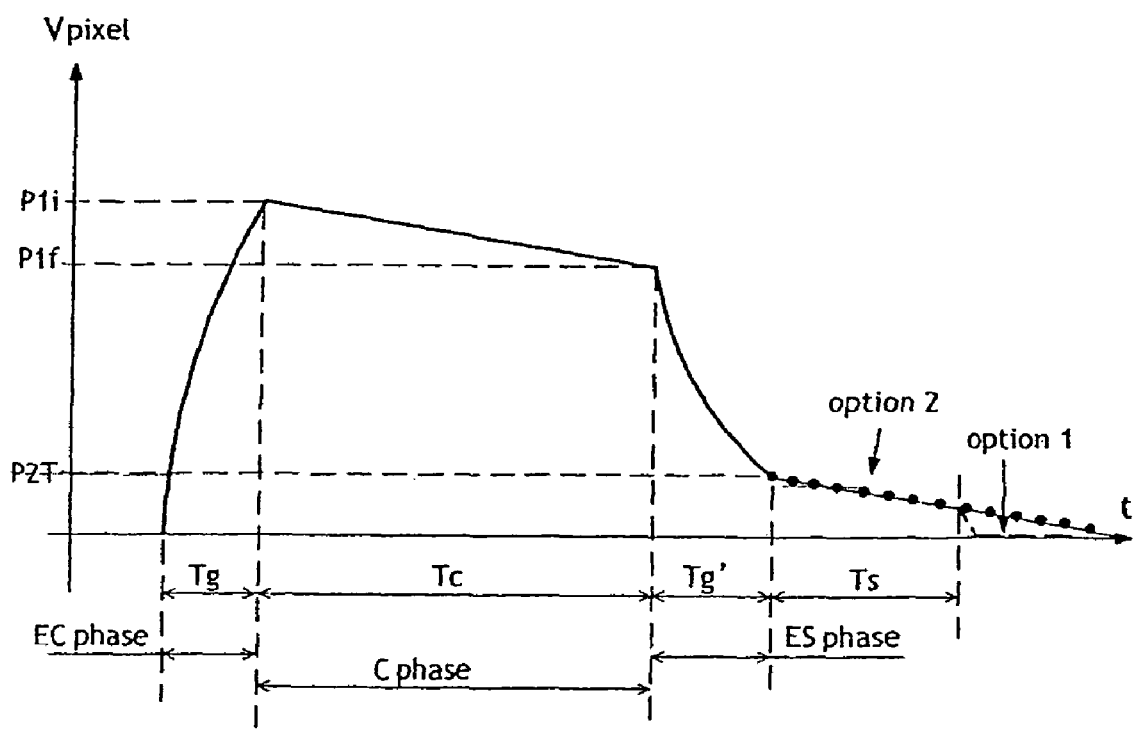
FIG_16
Electrical voltage at the terminals of a pixel for switching to the T state

FIG_17
Row voltage applied to the gate of the TFT: Option 1
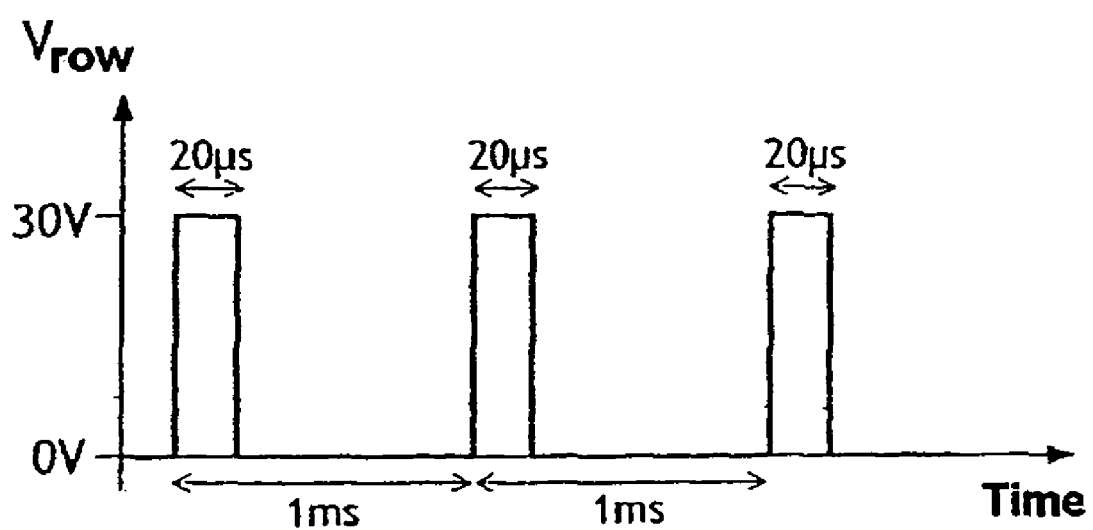

FIG_18
Row voltage applied to the gate of the TFT: Option 2
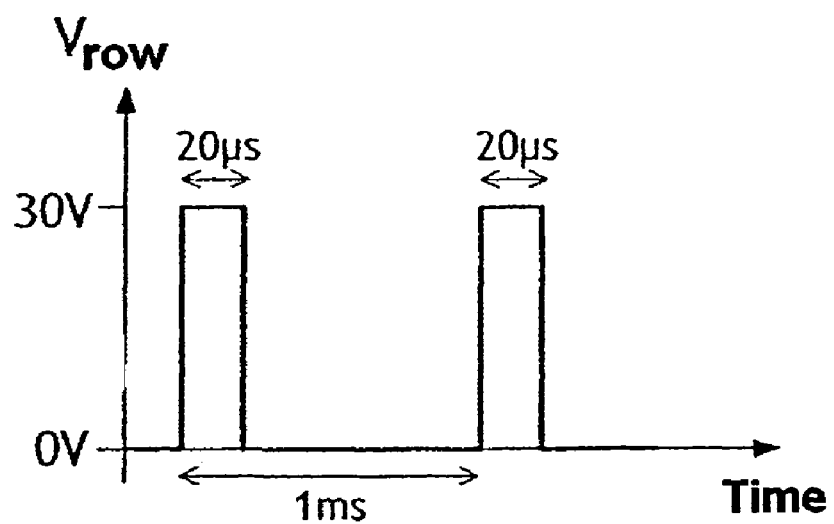

**Addressing an active BiNem according to Option 1 with 3 transitions
Simulated pixel signal for switching to the T texture**
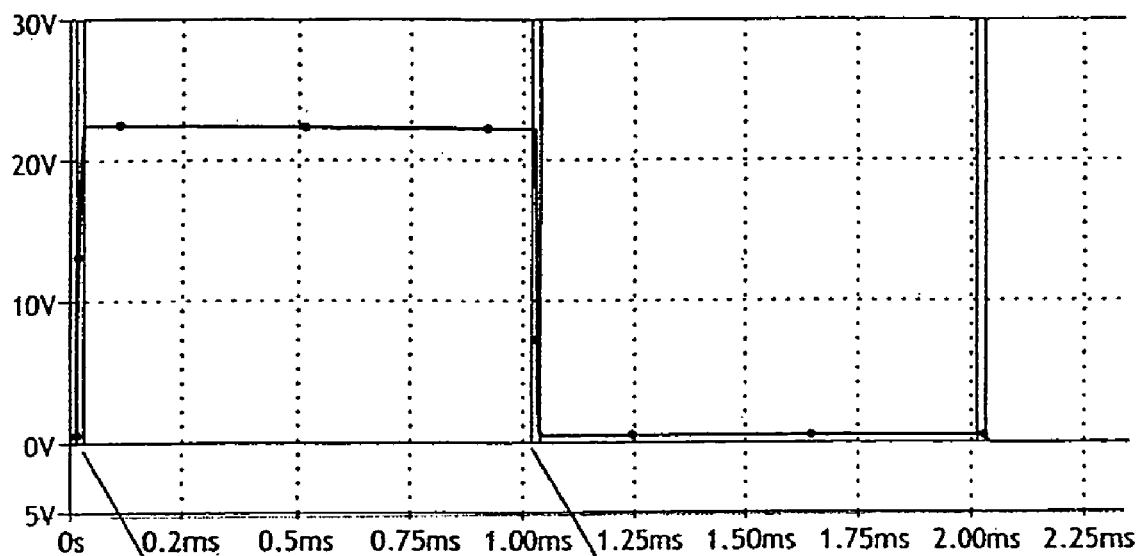
FIG_19a
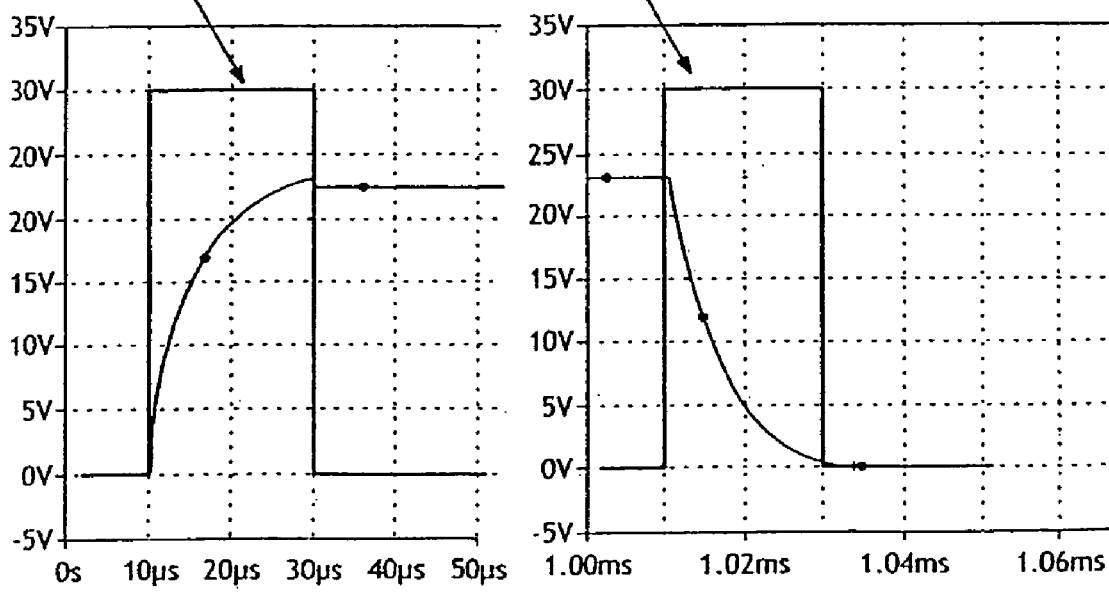
FIG_19b

FIG_20
Addressing an active BiNem according to Option 1 with 3 transitions
Simulated pixel signal for switching to the U texture
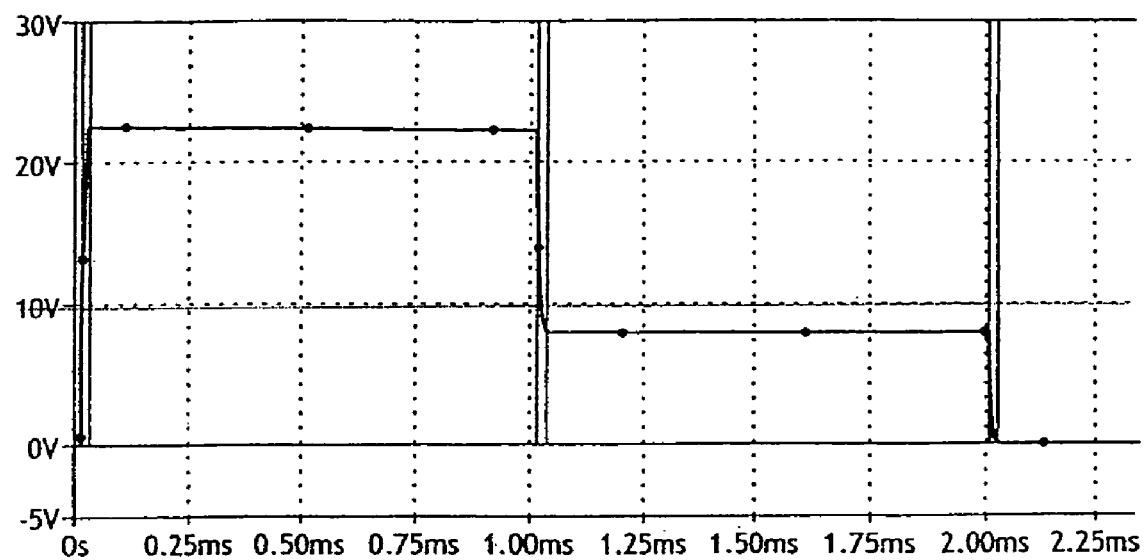

**Addressing an active BiNem according to Option 2 with 2 transitions
Simulated pixel signal for switching to the T texture**

**Addressing an active BiNem according to Option 2 with 2 transitions
Simulated pixel signal for switching to the U texture**

FIG. 23
FIG. 24
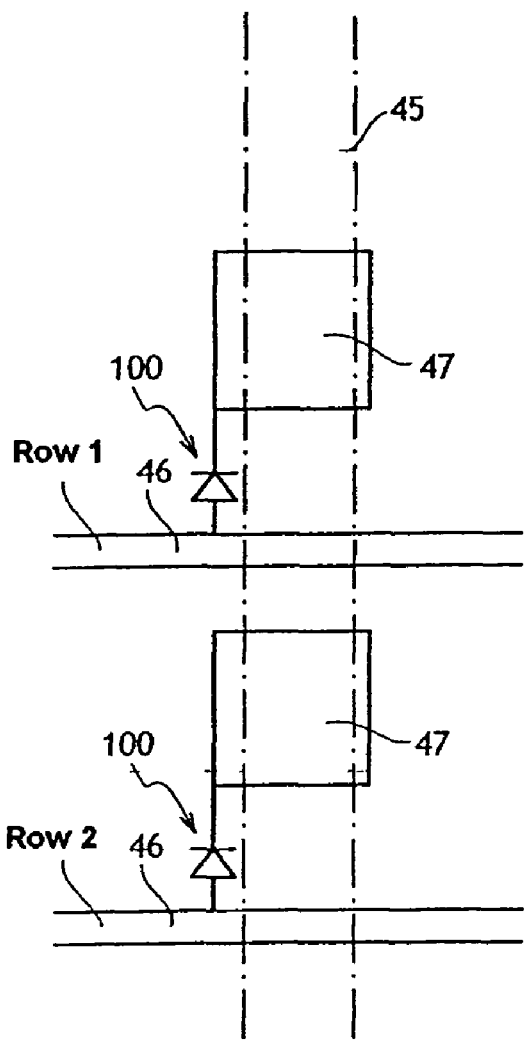
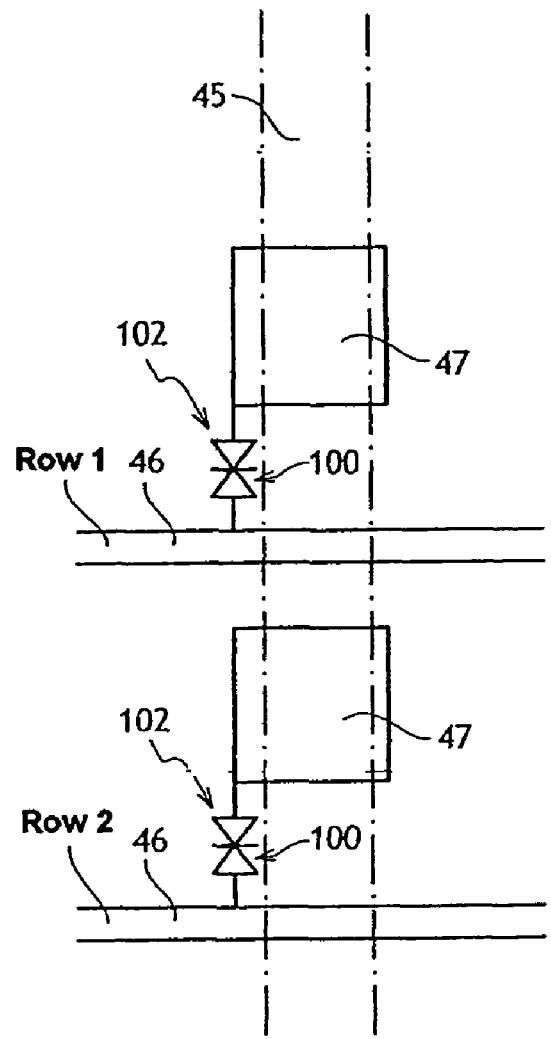
FIG. 25
FIG. 26
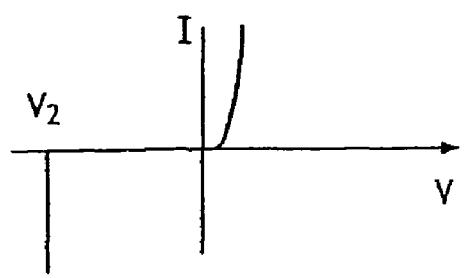
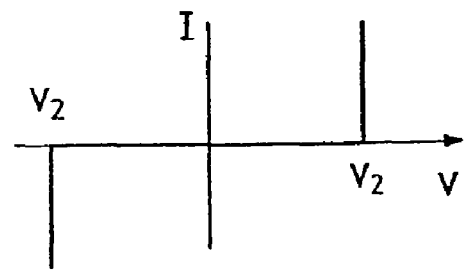

BISTABLE NEMATIC LIQUID CRYSTAL DISPLAY DEVICE AND METHOD FOR CONTROLLING SUCH A DEVICE

TECHNICAL FIELD

The present invention relates to the field of liquid-crystal display devices and more particularly to a method and a device for switching a bistable nematic display.

OBJECT OF THE INVENTION

A general object of the present invention is to improve the bistable display devices disclosed in document [1]. These devices are generally called "BiNem" devices. This terminology will be used for the purposes of the present patent application. The structure of these devices will be described in greater detail below.

PRIOR ART

A distinction may be made between nematic devices, cholesteric devices, smectic devices, ferroelectric devices and other devices according to the physical nature of the liquid crystal used. In nematic displays, which form the subject matter of the present invention, use is made of an achiral nematic or a chiralized nematic (for example chiralized by adding a chiral dopant). What is obtained in this way is a spontaneous texture that is uniform or slightly twisted, the pitch of the helix of which is greater than a few microns. The orientation and the anchoring of the liquid crystal near the surfaces bounded by substrates are defined by alignment layers or treatments applied to the said substrates. In the absence of a field, a uniform or slightly twisted nematic texture is imposed in this way.

Most devices proposed and produced hitherto are monostable. In the absence of a field, only a single texture is produced in the device. This texture corresponds to an absolute minimum of the total energy of the cell. In a field, this texture is continuously deformed and its optical properties vary according to the voltage applied. When the field is removed, the nematic returns again to the single monostable texture. Those skilled in the art will recognize among these systems the operating modes most widely employed in nematic displays: twisted nematics (TN), super twisted nematics (STN), electrically controlled birefringence (ECB) nematics, vertically aligned nematics (VAN), in-plane switching (IPS) nematics, etc.

Another class of nematic displays is that of bistable, multistable or metastable nematics. In this case, at least two separate textures—that are stable or metastable in the absence of a field—may be produced in the cell. Switching between the two states is achieved by applying suitable electrical signals. Once the image has been written, it remains stored in the absence of a field thanks to the bistability. This memory of bistable displays is very attractive for many applications. Firstly, it makes it possible to achieve a low image refresh rate (only when it is desired to change it), very favourable for reducing the power consumption of portable equipment. Secondly, the memory makes it possible to have a very high degree of multi-plexing, with image quality independent of the number of rows.

Description of the Bistable Screen Called BiNem (FIG. 1)

A novel bistable display is disclosed in document [1].

This display is shown amatically in FIG. 1.

It consists of a chiralized nematic liquid-crystal or cholesteric liquid-crystal layer 10 between two plates or substrates 20, 30, at least one of which is transparent. Two electrodes 22, 32 placed respectively on the substrates 20, 30 are used to apply electrical drive signals to the chiralized nematic liquid crystal 10 lying between them. Anchoring layers 24, 34 on the electrodes 22, 32 orient the molecules of the liquid crystal 10 in the desired directions. The anchoring 24 of the molecules on a master plate 20 is strong and slightly tilted, while on the slave plate 30 it is weak and flat. The anchoring 24, 34 of the molecules 10 on these surfaces 22, 32 is monostable.

An optical system completes the device.

More precisely, FIG. 1 shows schematically, on the left and on the right respectively, two states, each stable in the absence of a field, which can be occupied by the liquid-crystal molecules and, illustrated in the centre of the same FIG. 1 is a broken state that is stable in a high electric field and unstable in the absence of a field. This state is temporarily occupied by the liquid-crystal molecules during the process of driving the display.

The two bistable textures—U (uniform or slightly twisted) and T (twisted)—of the liquid crystal, illustrated on the left and on the right in FIG. 1 respectively, are stable with no field applied. The angle between the direction of anchoring on the master plate 20 and that on the slave plate 30 is small or zero. The twists of the two textures differ in absolute value by about 180°. The spontaneous pitch $p_0$ of the nematic is chosen to be close to 4 times the thickness d of the cell ($p_0 \cong 4.d$) in order to make the energies of the U and T textures essentially the same. With no field, there exists no other state with a lower energy: U and T exhibit true bistability.

One advantage of the BiNem structure is that the two textures—U and T—are planar, thereby making it possible to obtain a good viewing angle without a compensation film. The optical performance characteristics of the BiNem in reflective configuration are described, for example, in document [5].

Method of Switching Between the Textures of the BiNem

Switching from one texture to the other requires breaking the anchoring on the surface 32/34, possessing a low zenithal anchoring energy.

Physical Principle

The two bistable textures U and T are topologically separate—it is impossible to transform one into the other by a continuous volume distortion. The transformation from one U texture into a T texture, or vice versa, therefore requires either the anchoring on the surfaces to be broken, induced by a strong external field, or the displacement of a disclination line. This second phenomenon, which is markedly slower than the first, may be disregarded and will not be explained in detail below.

Any alignment layer of a liquid crystal may be characterized by a zenithal anchoring energy $A_z$. This energy is always finite. It may be shown that there is therefore a likewise finite threshold field $E_c$ (anchoring-breaking threshold), which gives the surface a homeotropic texture (H) whatever the previous no-field texture.

To break the anchoring requires the application of a field at least equal to the threshold field $E_c$. This field must be applied for a long enough time for the reorientation of the liquid crystal near the surface to result in the homeotropic texture as shown schematically in the centre of FIG. 1. This minimum time depends on the amplitude of the applied field, but also on the physical characteristics of the liquid crystal and on the alignment layer.

In the static case (fields applied for a few milliseconds or more), $E_c \cong A_z/\sqrt{K_{33}\epsilon_0\Delta\epsilon}$, where $A_z$ is the zenithal anchoring energy of the surface, $K_{33}$ is the elastic bending coefficient of the liquid crystal, $\Delta\epsilon$ is its relative dielectric anisotropy and $\epsilon_0$ is the dielectric constant of free space.

$V_c$ is defined as the anchoring-breaking voltage such that $V_c=E_c\cdot d$, where d is the thickness of the liquid-crystal cell. A typical value of $V_c$ is 16 V in the case of a BiNem.

The anchoring is said to be broken when the molecules are normal to the plate near this surface and when the restoring torque exerted by the surface on these molecules is zero. In practice, all that is required is for the difference between the orientation of the molecules and the normal to the surface to be small enough, for example less than 0.5°, and for the torque applied to the molecules at the surface to be quite small (such a state is shown schematically in the centre of FIG. 1). When these conditions are combined, the nematic molecules near the broken surface 34 are in unstable equilibrium when the electric field is switched off, and may either resume their initial orientation or rotate in the opposite direction and induce a new texture differing from the initial texture by a 180° twist.

Control of the final texture depends on the waveform of the applied electrical signal, in particular on the way in which this field is returned to zero.

A progressive reduction in the voltage of the pulse minimizes flow. The molecules close to the master plate 20 slowly drop down to their equilibrium state. Their elastic coupling with the molecules of the centre of the specimen makes them also tilt in the same direction. This movement diffuses until reaching the slave plate 30 where the molecules are in turn tilted rapidly in the same direction, aided by the surface torque. The uniform state U is progressively built up at the centre of the cell as shown schematically on the left of FIG. 1.

When the field suddenly decreases, the orientation of the liquid crystal is modified firstly near the strong surface (master plate 20), with a surface relaxation time of $\gamma_1 L^2/K$, where $L=K_{33}/A_z$ is the extrapolation length of the strong layer and $\gamma_1$ is the rotation viscosity of the liquid crystal. This time is typically of the order of ten microseconds or so.

Switching the strong surface 24 in such a short time induces a strong flow close to this surface, which diffuses into the volume and reaches the weak surface (slave plate 30) after a characteristic time of less than one microsecond. The shear induced on the weak surface (slave plate 30) creates a hydrodynamic torque on the molecules at this surface. This torque is in the opposite direction to the elastic torque induced by the tilt of the master plate 20. When the shear is high enough, the hydrodynamic torque on the weak surface 34 is the strongest, promoting the twisted texture T shown schematically on the right in FIG. 1. When the shear is weaker, the elastic torque on the weak surface 34 is the strongest, inducing the uniform texture U shown schematically on the left in FIG. 1.

The direction of rotation of the molecules in the cell is indicated by two arrows referenced respectively as RU (for switching into the U state) and RT (for switching into the T state) in FIG. 1.

The volume then reorients, with a characteristic volume relaxation time $\tau_{vol}$ of $\gamma_1 d^2/K$, where d is the thickness of the cell. This time, typically of the order of one millisecond, is much longer than the relaxation time of the strong surface.

Practical Implementation

In general, the switching of a BiNem-type liquid-crystal pixel takes place in two phases (an anchoring-breaking first phase and a selection second phase):

First phase: anchoring-breaking phase, denoted by C

The phase C consists in applying an electrical signal suitable for breaking the anchoring on the slave plate 30. In general, the shorter the phase C, the greater the peak amplitude of the applied signal must be.

For a given amplitude and a given duration, the details of the waveform of this signal (slopes, intermediate levels, etc.) do not have a pronounced effect on the execution of the next phase, provided that the anchoring breaking has been carried out.

Second phase: selection phase, denoted by S

The voltage applied during the phase S must allow one of the two bistable textures—U or T—to be selected. On account of the effect explained above, it is the falling waveform of the electrical pulse applied to the terminals of each pixel that determines the switching from one texture to the other.

To Switch to the Texture T:

Phase C: Anchoring Breaking

It is necessary, during the anchoring-breaking phase C to apply a pulse delivering a field greater than the field for breaking the anchoring on the slave plate 30 and to wait for the time required to lift the molecules in the pixel as illustrated in the centre of FIG. 1. The breaking field depends on the elastic and electrical properties of the liquid-crystal material 10 and on its interaction with the anchoring layer 34 deposited on the slave plate 30 of the cell. It varies from a few volts to about ten volts per micron. The time to lift the molecules is, proportional to the rotational viscosity $\gamma$ and inversely proportional to the dielectric anisotropy of the material 10 used and to the square of the applied field. In practice, this time may come down to a few microseconds for fields of 20 volts per micron.

Phase S: Selection of the Texture

The field then merely has to be reduced rapidly, by creating over a few microseconds, or at most a few tens of microseconds, a sudden drop in the drive voltage. This sudden voltage drop, of amplitude at least equal to a value $\Delta V$, is such that it is capable of inducing a sufficiently intense hydrodynamic effect in the liquid crystal. To produce the T texture, this drop $\Delta V$ must necessarily take the applied voltage from a value greater than the anchoring-breaking voltage $V_c$ to a value below this voltage.

An example of a signal for switching to the T texture is a signal of the square-wave type, with an amplitude $P1 > V_c$ and $P1 \geq \Delta V$. Its duration must be long enough to break the anchoring. The drop from P1 to 0, with $P1 \geq \Delta V$, allows T to be selected (cf. FIG. 2).

Another example of a signal for switching to the T texture is a two-level signal comprising an anchoring-breaking first sequence of duration $\tau_1$ and amplitude P1, where $P1 > V_c$, followed by a selection second sequence of duration $\tau_2$ and amplitude P2 such that $P2 \geq \Delta V$, i.e. $P1-P2 \geq \Delta V$. The drop time of the applied field must be less than one tenth of its duration or less than 30 micro seconds in the case of long pulses (greater than 1 ms).

To Obtain the U Texture:

Phase C: Anchoring Breaking

It is necessary, during the anchoring-breaking phase C, to apply a field greater than the anchoring-breaking field on the slave plate 30 for a time sufficient to lift the molecules as in the case of writing in the aforementioned state T.

Phase S: Texture Selection

It is then necessary to induce a "slow fall" in the voltage applied. Document [1] proposes two ways of implementing this "slow fall": the signal is either a pulse of duration $\tau_1$ and amplitude P1 followed by a ramp of duration $\tau_2$, the fall time of which is greater than three times the duration of the pulse (FIG. 3), or a stepped fall.

An example of a signal for switching to the U texture is a two-level signal comprising a breaking first sequence of duration $\tau_1$ and amplitude P1 (P1>$V_c$) followed by a selection second sequence of duration $\tau_2$ and amplitude P2 such that P2<$\Delta V$ and P1−P2<$\Delta V$. The two-level stepped fall is more easily achievable by means of digital electronics. However, it is possible, of course, to imagine a fall in a larger number of levels than two.

It is thus possible, by applying a simple two-level signal to the terminals of the pixel to obtain either the U texture or the T texture. The first level (P1, $\tau_1$) corresponds to the anchoring-breaking phase and the second level (P2, $\tau_2$) allows selection of the texture by the value of P2. This signal is illustrated in FIG. 4. A P2T value corresponds to a value of P2 for switching to T (for a given P1) and a P2U value corresponds to a value of P2 for switching to a U texture (for a given P1).

Typical values: P1=20 V, P2U=7 to 9 V for $\tau_1$=$\tau_2$=1 ms.

Conventional Addressing of the BiNem by Multiplexing

Principle of Conventional Multiplexing and Limitations

In the case of a medium-resolution matrix screen, a person skilled in the art knows that it is out of the question to connect each pixel individually to an independent drive electrode, as this would require one connection per pixel, which is topologically impossible as soon as the screen becomes complex. It is possible to save on connections by employing the technique of multiplexing when the electrooptic effect used is non-linear, which is the case for standard liquid-crystal technologies. The pixels are grouped together by a matrix system into n groups each of m pixels. These are, for example, n rows and m columns in the case of matrix screens, or n numerals and m parts of numerals for numerical displays. In the sequential addressing mode, which is used most often, a single row is selected at a time and then selection passes to the next row and so on until the last row. During the row select time, the column signals are applied at the same instant to all the pixels of the row. This method allows an image to be addressed in a total time equal to the row address time multiplied by the number of rows n. With this method, m+n connections are sufficient to address a screen of m×n pixels, where m is the number of columns of the matrix in question. A multiplexed matrix screen is illustrated in FIG. 5.

The electrical signal seen by the pixel is the difference between the signal applied to the row and the signal applied to the column, with which the pixel intersects.

This screen principle illustrated in FIG. 5 is called a "passive screen". A row electrode is common to all the pixels of this row and a column electrode is common to all the pixels of this column.

The conducting electrodes must be transparent. The material used by all manufacturers is ITO (a mixed indium tin oxide).

The drawback of multiplexing a passive screen is that a pixel is sensitive to the column signals throughout the image address time, and not only during the period of activation of its row. That is to say a pixel of the screen receives, during the image write time, in succession the column signals of its entire column. The signals applied to the pixel outside the time for selecting its row may be considered as parasitic signals, which come into play in the electrooptic response of the liquid-crystal pixel. More precisely, for TN or STN-type passive matrices or one of their variants under standard operating conditions the state of the liquid crystal in a pixel depends almost exclusively only on the RMS (root mean square) value of the voltage that is applied to it during the image address time. Therefore the final state of the liquid-crystal molecules, i.e. in fine the optical transmission of the pixel, is determined by the RMS value of the voltage applied during the image address time. In addition, the image refresh rate is imposed by the eye's sensitivity to flicker, typically 50 Hz. Sensitivity to the RMS value and a set rate have the consequence of limiting the number of rows of the screen, expressed by the Alt and Plesko criterion (document [2]). The multiplexing of a passive screen is therefore suitable for medium-resolution LCDs.

Multiplexing Applied to a BiNem

To be multiplexed, the pixel signal must be decomposed into a row signal, common to all the pixels, and a column signal which, depending on its sign, will allow either the U texture or the T texture to be obtained. FIG. 6 shows an example of row and column signals for producing the suitable pixel signal.

The row signal (FIG. 6a) has two levels: the first level provides a voltage A1 for a time $\tau_1$ and the second level provides a voltage A2 for a time $\tau_2$. The column signal (FIG. 6b for switching to the U state and FIG. 6c for switching to the T state) of amplitude C is applied only for the time $\tau_2$, this being positive or negative depending on whether the image is to be erased (i.e. to obtain the U state) or to be written (i.e. to obtain the T state). A time $\tau_3$ separates two row pulses. FIGS. 6d and 6e illustrate the signals applied to the terminals of an erased pixel (switching to U) and to the terminals of a written pixel (switching to T), respectively.

The conditions to be fulfilled for these signals are:

A1=P1; A2−C=P2U; A2+C=P2T.

In the above numerical example, one solution is:

A1=20 V, A2=10.5 V, C=2.5 V; hence P2U=8V and P2T=13 V; $\tau_1$=$\tau_2$=1 ms.

These signals are very simple and allow all their parameters to be easily adjusted to the characteristics of the screen.

The switching principle based on the waveform of the falling edge of the pixel signal is specific to a BiNem.

To take account of problems of degradation of certain liquid-crystal materials by electrolysis when they are subjected to a DC voltage, it is often useful to apply signals of zero or almost zero mean value to the pixels. Techniques for converting the basic signals of FIG. 6 into symmetrical signals of zero mean value are described in document [4].

Limitations of Multiplexing for a BiNem

Rate Limitation

In multiplexed addressing one row at a time, the time to write an image of n rows is equal to n times the address time for one row.

In the above example, the row time is 2 ms, i.e. in the case of 160 rows, an image time of 320 ms and in the case of 480 rows an image time of 960 ms.

These image write times are short and are incompatible with the displaying of moving images.

One solution for improving the image write rate, by addressing several rows at a time, is described in document [3].

However, this technique is limited to increasing the speed by a factor of the order of 2 or 3, insufficient for reaching the rate of around 50 Hz in a medium-resolution display (typically having 300 rows).

This limitation is common to BiNems and to standard liquid crystals.

Sensitivity to Parasitic Signals

In multiplexed mode, a pixel (N, M) is subjected to the pixel address row signal and to the column signal that relate to it. However, it is also subjected to the column signals of amplitude +/−C that are intended for the other pixels of column M of which it forms part, with a period $T=\tau_1+\tau_2+\tau_3$ (FIG. 7). These signals are parasitic signals that affect the pixel voltage during the image write time. This is because a nematic liquid crystal is sensitive to the root mean square voltage to which it is subjected. The optical appearance of the display is therefore disturbed during image writing.

One solution for reducing this effect has been proposed in document [4]. The duration of the column signal is reduced relative to the duration of the second level of the row signal, making it possible to reduce the parasitic signals and therefore the optical perturbation of the image during writing. However, this reduction is limited by several factors: when the operating temperature is lowered, it is necessary to increase the amplitude of the column signals in order to continue to switch between U and T. In addition, to make all the pixels of a cell switch, it is necessary to choose an amplitude C that is higher than that necessary for a single pixel, since the technology introduces spatial dispersion in the switching voltages, which must be taken into account.

Standard liquid crystals are also sensitive to the RMS value of the applied voltage, but this value influences the state of the pixel not only during writing of the image but permanently, since they must be addressed constantly in order to exhibit the desired optical state.

Sensitivity to the Electrical and Geometrical Characteristics of the Addressing Track According to what was described above, one specific characteristic of a BiNem is that switching to the T texture means that a steep voltage fall must be applied to the pixel. A signal of the double-level type having a sufficient voltage drop propagates along the entire ITO row as far as the last pixel of the row. Because of the electrical characteristics (Rs) of the row, the waveform of the pulse will be modified during its propagation. It is of fundamental importance for its waveform on arriving at the final pixel to be always compatible with switching to T. We will now examine in a typical example the variation in the falling slope of the signal applied to a row during propagation along this row.

To simplify matters, we will assume a square-wave signal of 20 V amplitude for switching to T. For this voltage, it has been determined that switching to T is effected if the voltage drop (from 90% to 10% of its value) is effected in less than a time Tt of approximately 30 µs.

Let us consider a display of M columns and N rows, of length L and width 1 (see FIG. 8). The length of a pixel is L/M=p. The width of a pixel is 1/N=a. The region of separation between the rows and columns is neglected and the active area of the pixel is p×a.

The equivalent circuit diagram for a row is given in FIG. 9. Each pixel is equivalent to a tripole comprising a series resistor Rpx and a parallel capacitor Cpx that are defined as follows:

$Rpx=p/a.R_s$, where $R_s$ is the surface resistance of ITO. The resistivity of the liquid crystal is neglected.

$Cpx = C_{LC} = \epsilon_0 \epsilon_r ap/e,$ where e is the thickness of the liquid-crystal cell $\epsilon_0$ is the dielectric constant of free space and $\epsilon_r$ is the relative dielectric constant of the liquid crystal.

The time constant Rpx.Cpx associated with each pixel is therefore:

$Rpx.Cpx = R_s(\epsilon_0 \epsilon_r/e)p^2.$

Propagation along the line is given by a diffusion equation. The impedance of the line is calculated analytically. The characteristic time Td at the end of the row of length L is $Td = R_s(\epsilon_0 \epsilon_r/e)L^2$.

The rise or fall (90%-10%) time at the end of a row for a step applied at the start of a row is 0.9 Td.

FIG. 10a shows the calculated waveform of the fall of the electrical signal applied to pixel M (pixel at the end of the row) for row lengths of 30, 60, 90, 120 and 150 mm with the following typical numerical values:

$\epsilon_0 = 8.854 \times 10^{-12}$ F/m; $\epsilon_r=15$; e=1.5 µm;

a=p=200 µm; $R_s=30\Omega$; $R_{contact}=1$ kΩ.

In FIG. 10a, it may be seen that beyond a length of 120 mm, the fall (90%-10%) takes place in a time Tt of more than 30 µs. Switching to the T state is therefore no longer possible.

One solution is to reduce the surface resistance $R_s$ of ITO. FIG. 10b employs the same parameters as in FIG. 10a, but with $R_s(ITO)=15\Omega$. By comparing the two series of curves, it may be seen that the 30 µs threshold is reached for a length of approximately 150 mm, compared with a length of 120 mm in the case of $R_s=30\Omega$. Reducing $R_s$ by a factor of 2 makes it possible to increase the length of the row only by the square root of 2.

However, reducing $R_s$ means increasing the thickness of the ITO and therefore the cost of the ITO. 15Ω would be a reasonable value, while 5Ω would be a limit value.

The relationship $0.9 R_s(\epsilon_0 \epsilon_r/e)L^2 < 30$ µs therefore limits the length of the row of the screen that may be addressed. This limitation is specific to the mode of switching a BiNem, which is sensitive to the waveform of the applied electrical signal. Standard liquid crystals (for example TN and STN) are sensitive to the root mean square of the applied electrical signal, which is less affected by this attenuation.

Active Addressing of Standard Liquid Crystals

Principle of Active Addressing

The principle of actively addressing a liquid-crystal pixel, for example using a TFT (thin film transistor), generally of the MOS type, is illustrated in FIG. 11. Each pixel is addressed via a TFT switch 40 that connects it to its column 45 during the addressing phase (row time) and isolates it from the external environment during the sustain phase (frame time or time to address the entire image), thereby making it possible to maintain a constant voltage at its terminals throughout the frame time. The switch is activated by sequentially scanning the rows 46 of the screen (as in the case of multiplexed addressing), or a closing voltage (to turn the transistor on) is applied for the corresponding row time and an opening voltage (to turn the transistor off) is applied while addressing the other rows. The row 46 is thus connected to the gate 41 of the MOS transistor 40 that controls the turning-off or turning-on of the transistor, the column 45 is connected to the source 42 and the drain 43 is connected to the drive electrode 47 of the liquid-crystal pixel. On the other face of the pixel, the back electrode 48 is common to all the pixels.

The equivalent circuit diagrams for a pixel when the transistor is on and off are given in FIGS. 12a and 12b, respectively.

Each actual pixel of a liquid crystal may be likened to a cell comprising a capacitor $C_{LC}$ in parallel with a resistor $R_{LC}$.

In the on state, as illustrated in FIG. 12a, a current flows through the resistor $R_{on}$ of the transistor and charges the aforementioned cell ($C_{LC}$, $R_{LC}$).

In the off state, as illustrated in FIG. 12b, a leakage current may discharge the capacitor $C_{LC}$ through the parallel resistor $R_{LC}$.

To minimize leakage during the sustain phase and parasitic inter-pixel coupling, a storage capacitor $C_S$ is generally added in parallel with the capacitor $C_{LC}$ of the liquid crystal, at the expense of complexifying the TFT technology.

The important electrical parameters in a TFT-addressed liquid-crystal screen are:
- $R_{on}$ and $R_{off}$ of the transistor;
- $Cpx=C_{LC}+C_s$: total capacitance of the pixel; and
- $R_{LC}$: resistance of the LC.

In addition, the tracks that form the rows 46 and the columns 45 that carry the electrical signal to the pixel have non-zero resistivities. The tracks 45 and 46 that intersect form, at the point of intersection, parasitic capacitors. The resistance and capacitance that are distributed along the track result in a distortion and a phase shift of the signal (idem ITO). The following terms are defined:
- $R_{ct}$: total resistance of the column track that transports the data to the pixel;
- $C_{ct}$: total capacitance of the column track that transports the data to the pixel.

The liquid-crystal alignment layers (not illustrated in FIG. 11) are deposited on the electrodes 47, 48, as in the case of multiplexed passive LCDs.

Advantages of Active Addressing

Rate

Typically, 75 Hz corresponds to a frame time of 13 ms, and 13 µs per row are needed to address 1000 rows. When the transistor is on, the row time to charge the capacitor of the liquid crystal must be of the order of one to a few tens of µs. This imposes a low value on the $R_{on}$ of the transistor. If this condition is met, high address rates for high-resolution images are possible with this method.

Resolution

When the transistor is off, the voltage is maintained at the terminals of the pixel, which is isolated from the parasitic column signals throughout the entire frame time. The multiplexing constraint (Alt and Pleshko criterion) is lifted and a large number of pixels may be addressed. The limitation is, in order to maintain a given grey level, that the voltage at the terminals of the pixel is maintained at a given value and does not vary more than the voltage difference between two grey levels. To do this, the leakage resistance of the pixel must be less than a certain value, which imposes a constraint both on the $R_{off}$ of the transistor and on the resistance $R_{LC}$ of the liquid crystal.

A few figures for a TFT addressing 1000 rows at 75 Hz, with 256 grey levels, are the following:
- frame time: 13 ms;
- row (gate open) time $T_g$: 13 µs;
- application of the voltage to the terminals for the pixel: this voltage must change by approximately 3 V in Tg=13 µs.

Maintaining the initial grey level: the voltage at the terminals of the pixel must be maintained with a variation of less than 10 mV during the frame time (13 ms). This constraint imposes a high $R_{off}$ of the transistor and a high resistance of the liquid crystal.

The so-called "standard" TFTs use a thin amorphous silicon (a-Si) layer and are coupled to the TN (twisted nematic) mode. For large screens of high added value, the TFT is associated more with the IPS (in-plane switching) or MVA (multidomain vertically aligned) modes that possess a better viewing angle.

Limitation of Active Addressing: Switching of Standard LC Screens

A major limitation of TFT screens for mobile applications is their not inconsiderable power consumption. For example, a TFT matrix monitor 15 inches in diagonal currently consumes close to 20 W, approximately half of which is used for the backlighting. This situation stems both from the non-bistable character of standard TFT screens (that exploit the TN effect), but also from the low luminous efficiency of TFT technology. One of the main causes of this low efficiency is the existence of a poor open aperture ratio. Under these conditions, the backlighting is virtually necessary for standard light backgrounds. The self-sufficiency of such a TFT screen device when it is not connected to a power supply network can only be short. This tendency is accentuated with TFT-IPS technology. The viewing angle in this technology is in fact comparable to that of BiNem screens, but the existence of an array of electrodes with a short pitch in order to apply the lateral field to the pixels further reduces the open aperture ratio. The power of the lighting system, and therefore the consumption of the device, must be greater than that of a conventional TFT for equivalent brightness of the image. In addition, IPS devices require significantly higher operating voltages than those of conventional TFT screens. The energy budget is therefore here too degraded. In addition, the cost burden caused by choosing the IPS technology represents a real obstacle for many high-volume applications. Not only is the power consumption of TFT screens high, but its non-bistable character means that it is impossible, even in favourable cases, to lower it.

DESCRIPTION OF THE INVENTION

The objective of the invention is to propose novel means for improving the prior art.

This objective is achieved within the context of the present invention by means of a display device comprising a bistable nematic liquid-crystal matrix screen with anchoring breaking, characterized in that it comprises:
- components capable of switching between an off state and an on state, these components being placed respectively between a drive electrode associated with each pixel and a display state control link; and
- means capable of applying, to the input of each aforementioned component, via the state control link, input signals comprising at least two phases separated by a controlled time interval, namely a first phase during which the input signal has an amplitude sufficient to permit breaking of the anchoring of the liquid crystal on the associated pixel, then a second phase during which the amplitude of the input signal is controlled in order to select one of the two bistable states of the liquid crystal, the time interval between the two phases being adapted in order to break the anchoring of the liquid crystal on the said associated pixel before the second input signal phase is applied.

Also more precisely, within the context of the present invention, the aforementioned components are preferably formed from switches driven between an off state and an on state by an address signal, and are placed respectively between a drive electrode associated with each pixel and a display state control link, and the device furthermore includes means capable of defining address signals that comprise at least two active phases controlling a switch in the on state, the said phases being separated by a controlled time interval, and capable of applying, to the input of each driven switch, via the state control link, in synchronism with the active phases of the address signal selectively turning the latter on, input signals comprising at least two phases, namely a first phase during which the input signal has an amplitude sufficient to permit breaking of the anchoring of the liquid crystal on the associated pixel, then a second phase during which the amplitude of the input signal is controlled in order to select one of the two bistable states of the liquid crystal, the time interval between the two phases being adapted in order to break the anchoring of the liquid crystal on the said associated pixel before the second input signal phase is applied.

We will call this structure "active BiNem".

For the purposes of the present invention, the expression "matrix screen" must not be considered as being limited to a regular arrangement of pixels in rows and columns. It encompasses any arrangement of pixels in the form of n groups of m associated elements, for example n numerals each formed from m elements.

The present invention also relates to a method for electrically controlling a bistable nematic liquid-crystal matrix screen with anchoring breaking, characterized in that it comprises:

the provision of components capable of switching between an off state and an on state, these components being placed respectively between a drive electrode associated with each pixel and a display state control link;

and in that it comprises the steps consisting, for the electrical control, in:

applying, to the input of each aforementioned component, via the state control link, input signals comprising at least two phases separated by a controlled time interval, namely a first phase during which the input signal has an amplitude sufficient to permit breaking of the anchoring of the liquid crystal on the associated pixel, then a second phase during which the amplitude of the input signal is controlled in order to select one of the two bistable states of the liquid crystal, the time interval between the two phases being adapted in order to break the anchoring of the liquid crystal on the said associated pixel before the second input signal phase is applied.

According to another advantageous feature of the present invention, the screen according to the present invention uses two textures—one a uniform or slightly twisted texture in which the molecules are at least approximately parallel to one another and the other that differs from the first by a twist of about +180° or −180°.

Although the use of active addressing, via respective controlled switches, offers many advantages within the context of a BiNem-type screen, that is to say using a bistable nematic liquid crystal with anchoring breaking, a person skilled in the art would have been unable to find any encouragement in the literature of the prior art to achieve such a result.

Quite to the contrary, the required waveforms and durations of the control signals for active addressing had hitherto been incompatible with an operational bistable screen of the BiNem type.

Moreover, the power consumption of an actively addressed liquid-crystal screen appeared to be completely unacceptable to those skilled in the art in the context of a BiNem screen.

Finally, the cost of actively addressed screens, especially because of the presence of a switch associated with each pixel could not hitherto have encouraged a person skilled in the art to obtain such a result.

Dissociating the address signals and the control signals, in two phases separated by a controlled time interval, as proposed within the context of the present invention, thus constitutes a considerable innovation, making it possible to achieve a real improvement over the prior art, as will be explained in detail below.

Other features, objects and advantages of the present invention will become apparent on reading the detailed description that follows, in conjunction with the appended drawings, given by way of non-limiting examples, in which:

FIG. 1, described above, shows schematically a BiNem screen according to the prior art;

FIG. 2, described above, shows an example of a square-wave pixel signal for switching to the T state, for such a BiNem screen;

FIG. 3, described above, shows an example of a pixel signal with a gradual falling edge for switching to the U state, for such a BiNem screen;

FIG. 4, described above, shows an example of a two-level pixel signal, allowing selection of the texture according to the P2 value of the second level of the pulse applied to the terminals of the pixel, for such a BiNem screen;

FIG. 5, described above, shows schematically a multiplexed matrix screen;

FIG. 6, described above, shows an example of row and column signals for a pixel of a BiNem screen in multiplexed mode;

FIG. 7, described above, shows an electrical signal at the terminals of a pixel of a BiNem screen in multiplexed mode;

FIG. 8, described above, gives another representation of a multiplexed display;

FIG. 9, described above, illustrates an equivalent circuit diagram for a row of a multiplexed liquid-crystal display, of the BiNem screen type in multiplexed mode;

FIG. 10, described above, shows the variation in the waveform of the falling edge of the voltage applied to a pixel of a BiNem-type screen in multiplexed mode, during propagation along a row, for an ITO surface resistance of 30Ω in FIG. 10a and 15Ω in FIG. 10b, respectively;

FIG. 11, described above, shows schematically the general principle of active addressing, in accordance with the prior art;

FIG. 12, described above, shows the equivalent circuit diagram of a liquid-crystal pixel addressed by a transistor, in the on state in FIG. 12a and in the off state in FIG. 12b, respectively;

FIG. 13 shows the addressing of an "active BiNem" screen according to the present invention, for switching as required to the U state or to the T state, according to a first implementation option comprising three successive phases or stages of applying control signals: more precisely, FIG. 13a shows the address signal applied to the gate of a transistor; FIG. 13b shows two variants of the state control signal applied to the source of the transistor, in order to obtain the U and T states respectively; FIGS. 13c and 13d show the resulting signal available on the drain of the transistor and consequently on the pixel, in the case of switching to the U state and in the case of switching to the T state respectively; and FIG. 13e shows schematically a second address signal offset with respect to that of FIG. 13a and intended for a second row of the display;

FIG. 14 shows the equivalent circuit diagram of a BiNem-type liquid-crystal pixel addressed by a transistor, for example of the TFT type, according to a second implementation option comprising two successive phases or stages of applying control signals;

FIG. 15 shows schematically the addressing of an "active BiNem" screen according to the present invention for switching, as required, to the U state or to the T state according to a second implementation option comprising two successive phases or stages of applying control signals: more precisely, FIG. 15a shows the address signal applied to the gate of a transistor; FIG. 15b shows the state control signal applied to the source of the transistor; FIGS. 15c and 15d show the resulting signal available on the drain of the transistor and consequently on the pixel, in the case of switching to the T state and in the case of switching to the U state respectively; and FIG. 15e shows schematically a second address signal offset with respect to that of FIG. 15a and intended for a second row of the display;

FIG. 16 shows schematically the electrical voltage at the terminals of a pixel according to the present invention for switching to the T state;

FIG. 17 shows schematically the row address voltage applied to the gate of a transistor in the case of the first option according to the present invention;

FIG. 18 shows an example of a row address voltage applied to the gate of a transistor in the case of the second option according to the present invention;

FIG. 19 shows schematically an example of addressing an active BiNem according to the first option, comprising three successive control voltage applications, for a simulated pixel signal for switching to a T texture, FIG. 19b showing a partial enlarged view of the rising and falling edges of the signal of FIG. 19a;

FIG. 20 shows an illustration similar to FIG. 19 for a simulated pixel signal for switching to the U texture;

FIG. 21 shows the addressing of an active BiNem according to the second option according to the present invention, comprising two successive control voltage applications for a simulated pixel signal for switching to the T texture, here again FIG. 21b showing a partial view on an enlarged scale of the rising and falling edges of the signal of FIG. 21a;

FIG. 23 shows schematically an embodiment according to the present invention comprising switching means in the form of a diode for each pixel;

FIG. 24 shows schematically another embodiment according to the present invention, comprising switching means in the form of two back-to-back diodes for each pixel;

FIG. 25 shows the response of a diode used in the embodiment of FIG. 23; and

FIG. 26 shows the response of two diodes mounted back to back used in the case of the embodiment of FIG. 24.

The overall structure of the screen according to the present invention is identical to the structure of a conventional TFT screen as illustrated in FIG. 11.

Figure 1:
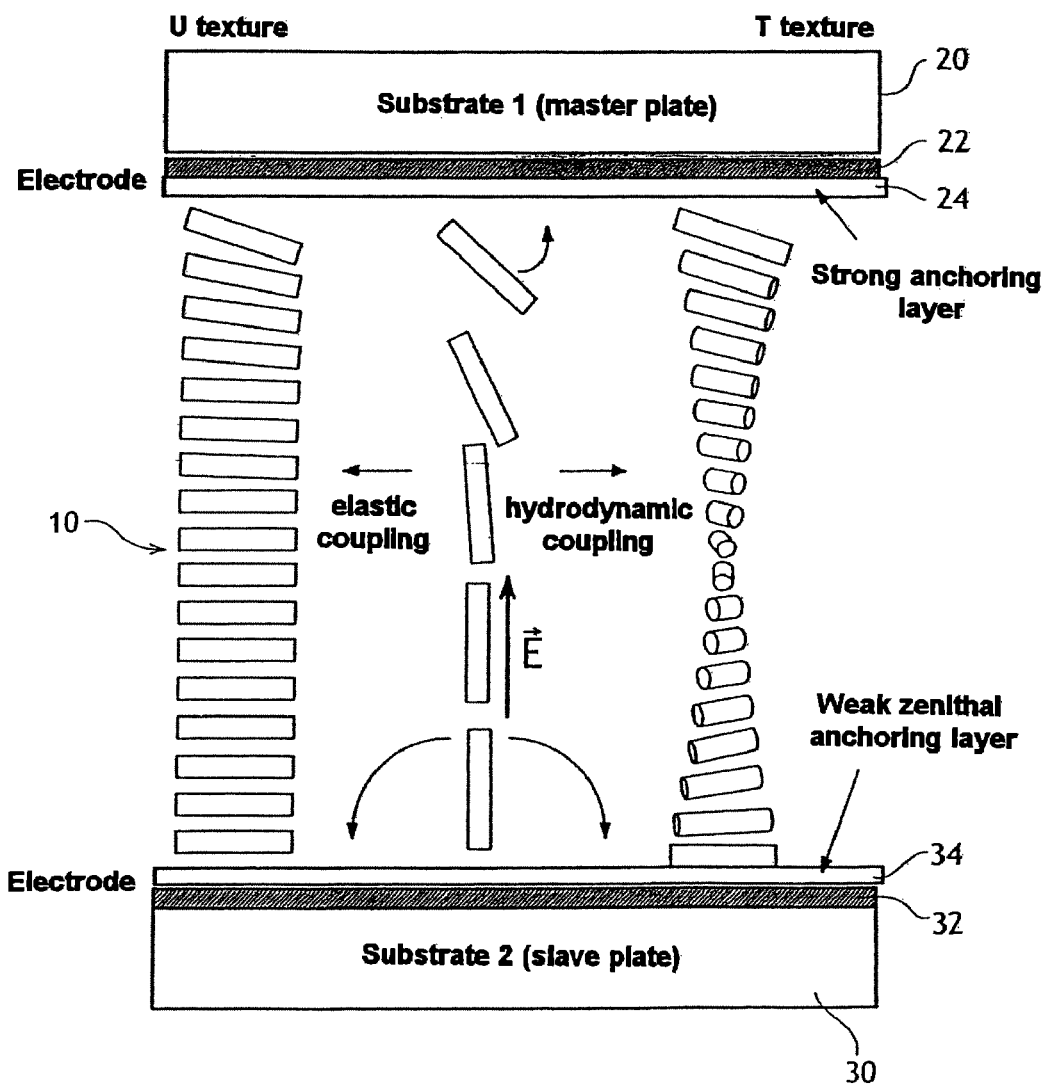

The essential differences from such a conventional TFT screen are the following:

one of the standard orientation layers is replaced with a weak zenithal anchoring orientation layer 34 specific to the BiNem;

the cell is made with a smaller thickness than in the case of standard technology; and the cell is filled with a BiNem-tailored liquid crystal so as to obtain the two textures U and T as illustrated in FIG. 1, and also operation of the cell in BiNem mode.

Thus, typically, in the case of the present invention, for each pixel defined between two electrodes 22, 32 facing each other and placed on one of the two plates or substrates 20, 30 respectively, one of the electrodes is connected to the drain 41 of a respective transistor 40, forming a switch, the source 42 of the latter is connected to a state control track or link, for example a column 45, in order to receive a state control signal, the gate 41 of the transistor is connected to a drive or address track or link, for example a row 46, in order to receive a drive or address signal, and the back electrode is connected to a common potential, for example earth, this being common to all the pixels.

For a screen of n×m pixels grouped together in the form of n groups of m elements, for example m rows of m columns, n×m controlled switches 40 are thus provided, an array of n conducting tracks forming address rows for the latter and an array of m conducting tracks forming columns for controlling the transistors.

When no signal is applied to the gate 41 of a transistor 40, it is off, that is to say non-conducting.

On the other hand, when a suitable signal is applied to the gate 41 of this transistor 40, it is turned on. The voltage applied to the source 42 of the latter then appears on the drain 43 of the transistor and consequently on the associated electrode 47 of the latter.

The pixel formed by the liquid crystal placed between two electrodes constitutes a capacitor capable of maintaining this voltage at its terminals when the transistor is switched to the off state, that is to say when the address signal applied to its gate is cut off.

The subsequent variation in this voltage, before application of a new address signal and a new control signal, depends on the impedance defined between the two electrodes of the pixel.

Hereafter, the aforementioned switch transistors associated with each pixel respectively will be called TFTs (thin film transistors).

However, the present invention must not be considered as being limited to any one technology for producing the controlled switches. It encompasses any technology capable of carrying out such a function. For example, a system based on one or more diodes may be envisaged.

The TFTs 40 make it possible to isolate all the pixels of the screen except those associated with the addressed row 46, which are each connected via their column track 45 to a column driver.

Conventional standard addressing of TFTs requires all the pixels in each frame to be addressed and controlled, whereas the bistability of the BiNem allows only the pixels whose state is modified between each frame to be selectively controlled. Because of the bistability, it is thus possible to achieve highly individual addressing. We will call this mode "selective addressing".

More precisely, in the context of the present invention, at each addressing of a row, the pixels that have to change state must receive a switching signal on the source of their associated transistor, in order to provide, in succession, anchoring breaking followed by selection, the other pixels possibly remaining earthed, that is to say receiving a zero voltage via their transistor placed in the on state (this is because such a zero voltage cannot break the anchoring and consequently cannot modify the state of the pixel). The power consumption may thus be greatly reduced, almost zero in the case of slowly varying images. The contrast and brightness of the screen will be optimum in this case, the switching of a pixel via the intermediate switching states not appearing at each frame but only when this pixel has to change state. The flickering of the image is thus completely eliminated.

The addressing of the active BiNem takes place according to the invention several times, in the form of at least two phases separated by a controlled time interval. The present invention is thus fundamentally different from the addressing of a standard TFT, which takes place once since standard liquid crystals become oriented simply according to the value of the applied field.

The essential function of the address and control signals according to the present invention is to produce a correct signal, for example with two levels, at the terminals of the pixel by firstly applying, during a first phase, a control voltage P1 (for a row address time Tg) via the source of the transistor, in order to achieve breaking, then by applying, after a time Tc called the breaking time, during a second phase, a control voltage P2U or P2T (for a row address time Tg' that may be different from Tg) again via the source of the transistor, making it possible to obtain the U texture or the T texture. It may also be necessary to apply a third voltage, close to or equal to zero, during a subsequent third phase.

We will firstly describe the two addressing options (with three phases and two phase respectively) for switching between U and T, and we will then enlarge the addressing concept to the construction of a BiNem with grey levels.

Switching Between U and T

Option 1: 3-Phase Addressing

This option is illustrated in the timing diagram of FIG. 13.

In FIG. 13, the frame time is denoted by TRA, that is to say the address signals illustrated in FIG. 13a and the state control signals illustrated in FIG. 13b are repeated with a repetition period TRA (the non-selective addressing case or the selective addressing case when the pixel changes state) or a multiple of TRA (selective addressing case when the pixel does not change state at each frame).

As illustrated in FIG. 13a, the address voltage is applied three times in succession to the gate 41 of a transistor 40 in order to switch it to the on state:

in the first phase, the address signal has a duration Tg;

in the second phase, the address signal, whose rising edge is delayed by Tc relative to the first, has a duration Tg'; and in the third phase, the address signal whose rising edge is delayed by Ts relative to the second has a duration Tg".

The times Tg, Tg' and Tg" may be the same or different.

The time Tc is defined so as to be sufficient to ensure that the weak anchoring 34 on the substrate 30 is broken before the select signal of duration Tg' is applied.

As illustrated in FIG. 13b, three control voltages are applied in succession to the pixel via the associated transistor 40, in synchronism with the aforementioned address voltages of duration Tg, Tg' and Tg" (the rising edges of these three voltages are also separated by a time Tc and then Ts):

first phase (duration Tg) a control voltage P1 is applied to the source of the transistor in order to achieve breaking; and second phase (duration Tg', after a time Tc): a control voltage P2T or P2U is applied to the source of the transistor depending on the texture to be obtained.

Figure 4:
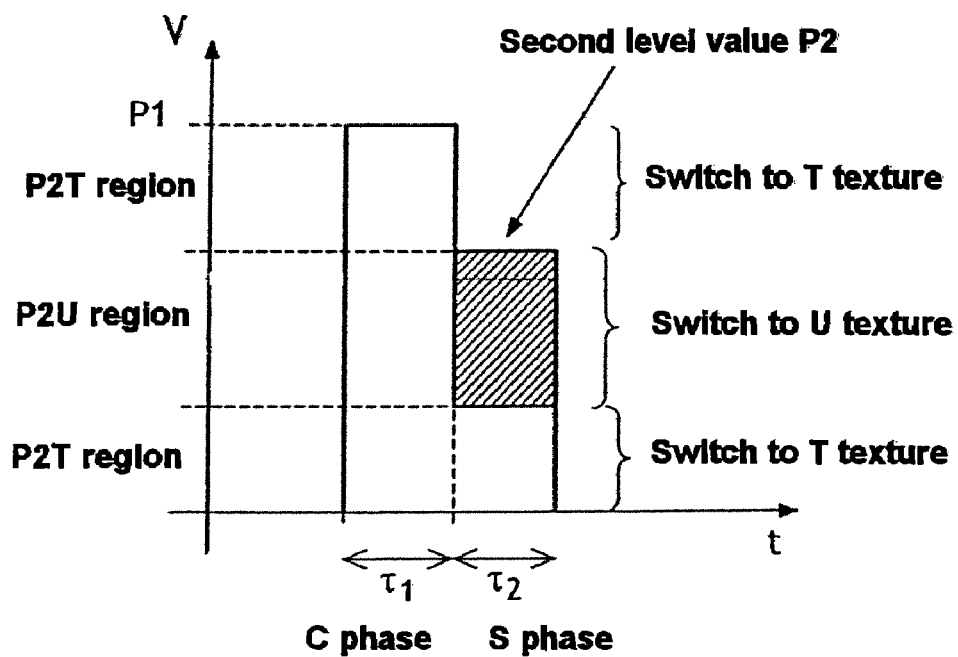
Figure 5:
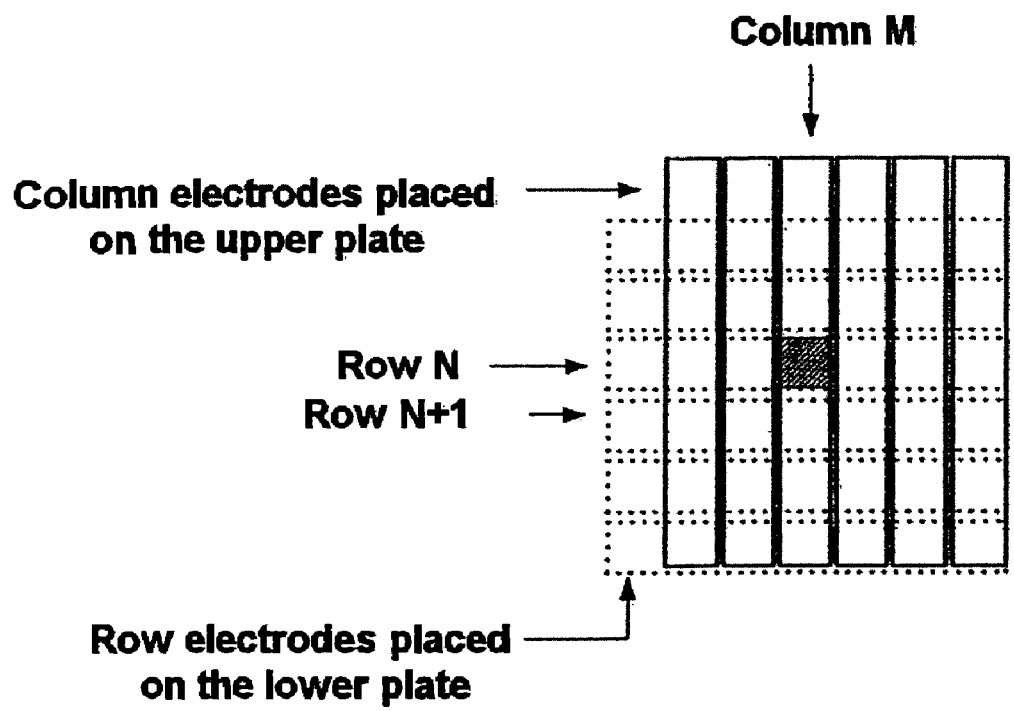
Figure 8:
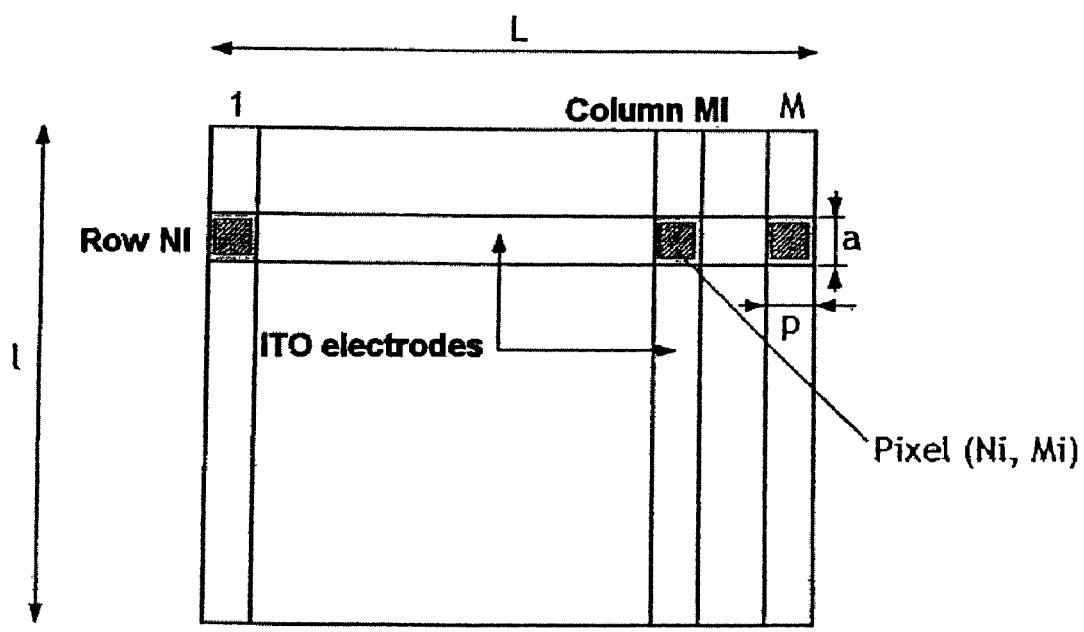
Figure 12A:
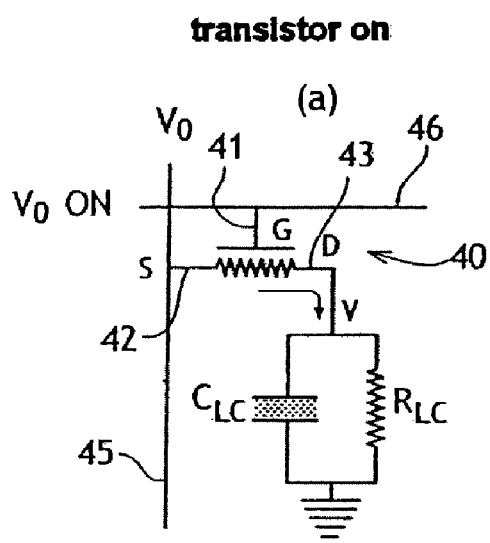
Figure 12B:
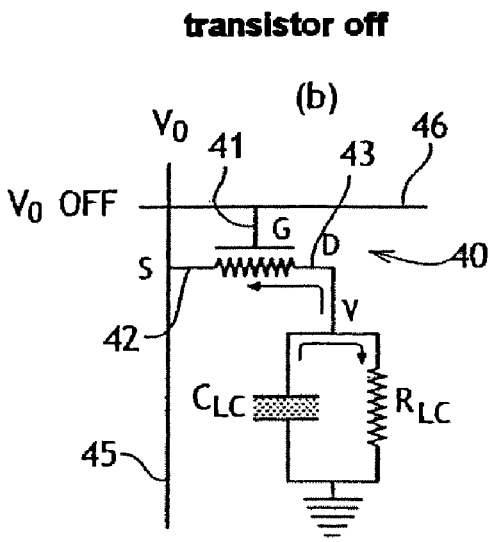

In order to switch to the T state, the two (high and low) regions shown schematically in FIG. 4 may be used for P2T.

If it is the low value of P2T that is chosen, this may be chosen to be zero or very low, as there is in this case no constraint associated with multiplexing requiring selection between T and U to be made with the sign of a single column signal C. Since the voltage jump is larger (P1 compared with P1-P2T), the switch to T is facilitated. Such a signal is of the square-wave type illustrated in FIG. 2.

For switching to the U texture, the voltages P2U of FIG. 4 are suitable;

third phase (duration Tg", after a time Ts): reset to zero with a zero or very low voltage P0T or P0U.

As indicated above, during the second phase Tg', for the T texture, the two (high and low) regions illustrated in FIG. 4 may be used for P2T. In the low P2T case, switching to T is initiated during the second addressing Tg'. In the high P2T case, switching to T is initiated during the third addressing Tg", at the moment of the voltage drop between P2T and P0T.

For the U texture, resetting to zero after application of P2U allows the liquid-crystal molecules to reach a rest state before a new addressing sequence. Therefore, after a time Ts called the select time, a zero or almost zero voltage P0U is applied for a time Tg" (new opening of the row) to the terminals of the pixel. P0U is not necessarily equal to P0T.

The resulting control signal obtained on the drain of the transistor, and consequently on the pixel, for a low P2T voltage during the phase Tg' is illustrated in FIG. 13c. During Tg, the capacitor of the pixel is charged to the voltage P1. After Tg, this capacitor possibly discharges through the parallel leakage resistors. The voltage at the terminals of the pixel is reset to P2T during Tg'. The capacitor possibly discharges after Tg'. Finally, the voltage at the terminals of the pixel is reset to zero during Tg". This signal results in the T state.

Likewise, the resulting control signal obtained on the drain of the transistor, and consequently on the pixel, for a voltage P2U during the phase Tg' is illustrated in FIG. 13d. During Tg, the capacitor of the pixel is charged to the voltage P1. After Tg, this capacitor possibly discharges through the parallel leakage resistors. The voltage at the terminals of the pixel is reset to P2U during Tg'. The capacitor possibly discharges after Tg'. Finally, the voltage at the terminals of the pixel is reset to zero during Tg". This signal results in the U state.

In general, the principle described above according to the present invention may be extended to x successive applications each of duration $Tg^x$, separated by control time intervals Tc followed by various $Ts^x$, of various control signals. The advantage of increasing the number of control signal application phases is to better approximate optimum signal for switching to the U state, this being a continuously decreasing ramp. Addressing with four transitions makes it possible to approximate the ramp with three levels, etc. The drawback is an overall row time that increases with the number of transitions. For the same state control, each row is therefore addressed x times with a frame period TRA (non-selective addressing case or selective addressing case when the pixel changes state) or a multiple of TRA (selective addressing case when the pixel does not change state at each frame).

Between the addressing phases $Tg^x$ for one row, other rows may be addressed.

Thus, FIG. 13e schematically illustrates an example of an address signal offset relative to the address signal described above and capable of controlling a second row adjacent to that mentioned above.

Option 2: Two-Phase Addressing

This option is illustrated in the timing diagram of FIG. 15.

Here again, in FIG. 15 the frame time is denoted by TRA, that is to say the address signals illustrated in FIG. 15a and the state control signals illustrated in FIG. 15b are repeated with an addition period TRA (non-selective addressing case or selective case when the pixel changes state) or a multiple of TRA (selective addressing case when the pixel does not change state at each frame).

As illustrated in FIG. 15a, the address voltage is applied twice in succession to the gate 41 of a transistor 40 in order to switch the latter to the on state:

in the first phase, the address signal has a duration Tg;

in the second phase, the address signal, the rising edge of which is delayed by Tc relative to the first, has a duration Tg'.

The times Tg and Tg' may be identical or different.

The time Tc is defined to be sufficient to ensure that the weak anchoring 34 on the substrate 30 is broken before the select signal Tg' is applied.

As illustrated in FIG. 15b, two control voltages are applied in succession to the pixel via the drain 43 of the associated transistor 40, in synchronism with the aforementioned address voltages Tg and Tg' (separated by a time Tc called the breaking time);

first phase (duration Tg): a control voltage P1 is applied to the source of the transistor in order to achieve breaking; and second phase (duration Tg', after a time Tc): a control voltage P2T or P2U is applied to the source of the transistor depending on the texture to be obtained.

Let P1f be the voltage of the terminals of the pixel at the start of the second transition Tg' (cf. FIG. 16).

For the T texture, P2T must be low enough (ideally P2T≈0) for the voltage jump between P1f and P2T to allow switching to the T state. Likewise, the voltage P1f must remain high enough for the voltage jump between P1f and P2T to allow switching to the T state.

Figure 2:
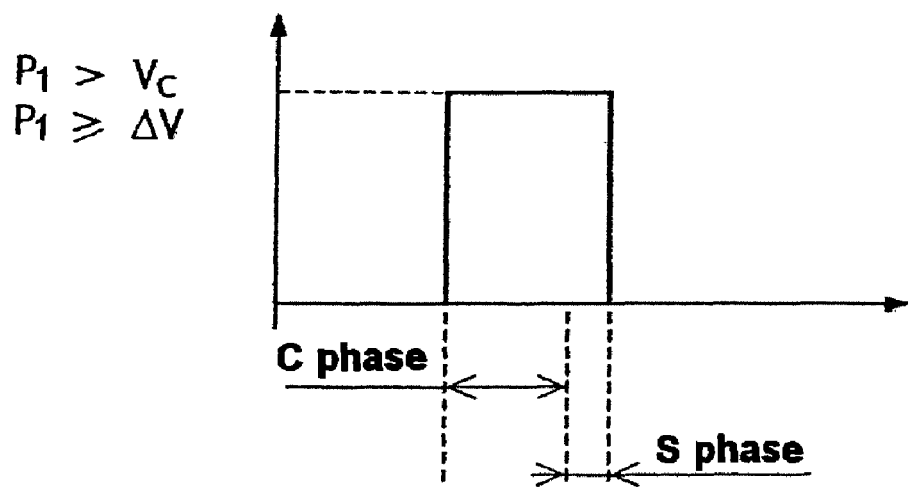

In the case of zero P2T, since the voltage jump is greater (P1f compared with P1f-P2T), the switching to T is facilitated (the signal applied to the pixel is then of the square-wave type illustrated in FIG. 2). A second advantage of a zero P2T is that the liquid-crystal molecules are at rest during the next switching.

The high P2T value (cf. FIG. 4) cannot be used here since there would be no resetting to zero of the voltage P2T, which would remain applied throughout the frame time TRA.

Figure 3:
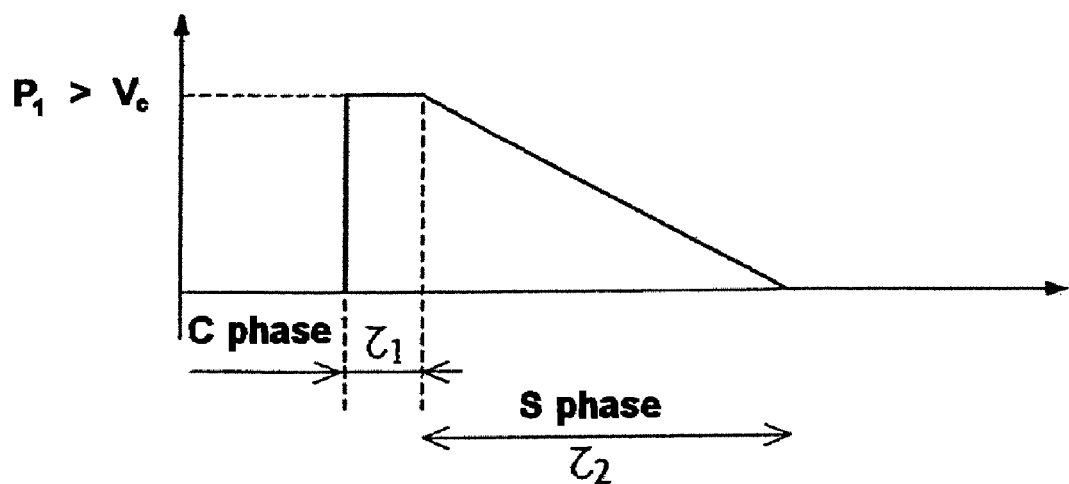

For switching to the U state, the voltage P2U may be close to the voltage P1f so as to obtain a fall in the form of a continuous ramp. A decreasing ramp signal waveform as described in FIG. 3 is thus obtained by means of the discharge current obtained in the leakage resistors present at the terminals of the pixel. This signal waveform is well suited to switching to the U state.

To obtain the optimum discharge time, that is to say the time sufficient to switch to the U state, but less than the frame time TRA, it may be necessary to add a discharge resistor RF to the terminals of the pixel, as illustrated in FIG. 14.

Switching to the T State:

FIG. 15c illustrates the resulting control signal obtained on the pixel, for a low P2T voltage during the phase of duration Tg'. During Tg, the capacitor of the pixel is charged to the voltage P1i. After Tg, the capacitor of the pixel possibly discharges through the parallel leakage resistors. The voltage is thus equal to P1f before the second addressing transition of duration Tg', where P1f<P1i. The voltage at the terminals of the pixel is reset to P2T during Tg'. P1f must be such that P1f-P2T allows switching to the T state. The capacitor discharges after Tg' in order to obtain a zero voltage before the end of the frame TRA. This signal results in the T state.

Switching to the U State:

Likewise, FIG. 15 illustrates the resulting control signal obtained on the drain of the transistor, and consequently on the pixel, for a voltage P2U during the phase Tg'. During. Tg, the capacitor of the pixel is charged to the voltage P1i. After Tg, this capacitor discharges through the parallel leakage resistors. The voltage is thus equal to P1f before the second addressing transition of duration Tg', where P1f<P1i. The voltage at the terminals of the capacitor of the pixel is reset to P2U during Tg'. The capacitor discharges after Tg' in order to obtain a zero voltage before the end of the frame TRA. This signal results in the U state.

Because of the existence of a discharge resistor $R_F$, the value P1f-P1i is greater in the case of option 2 than option 1.

For the same state control, each row is therefore addressed twice (Tg and Tg') with a frame period TRA. Between these addressing phases, separated by a time Tc, other rows may be addressed.

Here again, FIG. 15e thus illustrates schematically an example of an address signal offset relative to the address signal described above and capable of controlling a second row adjacent to that mentioned above.

Conditions for Obtaining Switching with the Active BiNem

FIG. 16 shows in detail the variation of the voltage at the terminals of a pixel, for switching to the T state, which is the most critical switching (since it requires an abrupt drop at a time Tt of less than a threshold of around 30 µs).

Four successive stages may be distinguished in this variation.

1. EC Phase of Duration Tg: Establishment of the Anchoring-Breaking Voltage at the Terminals of the Pixel.

The voltage P1i that must be reached at the end of the time Tg, i.e. at the end of the conducting period of the transistor, must be greater than the anchoring-breaking voltage $V_c$, typically 15 to 18 V at room temperature:

P1i>$V_c$≈15 to 18 V;

Tg around 20 µs.

The voltage to be reached does not have to be of precise value, it need only exceed $V_c$ in order to be able to break the anchoring. In addition, the P1 anchoring-breaking voltage may be different for switching to the U state or for switching to the T state. In contrast, in the case of a standard TFT with a TN or other liquid crystal, a very precise value must be obtained in the time Tg in order to obtain reliable grey levels. For the EC phase, the constraint on the combination of a TFT and an active BiNem liquid crystal according to the present invention is therefore less than in the case of a TFT coupled to standard liquid crystals.

The electrical parameters involved in charging to P1 are: the resistance $R_{on}$ of the transistor, the capacitance of the pixel $Cpx=C_{LC}+C_S$, the time to propagate along the column track and its resistance, these being determined from $R_{ct}$ and $C_{ct}$.

2. C Phase of Duration Tc-Tg: Anchoring Breaking.

During the time Tc-Tg after Tg, the transistor is off and the voltage P1 must be maintained above $V_c$ in order to break the anchoring. Let P1f be the voltage at the terminals of the pixel at the end of the time Tc: P1f>$V_c$≈15 to 18 V.

Typically, a reduction by a few volts is acceptable during the time Tc-Tg. The voltage P1 does not need to be maintained at a precise level, unlike in the case of a standard TFT generating grey levels. In the case of the C phase, the constraint on the combination of a TFT and an active BiNem liquid crystal according to the present invention is therefore less than that for a TFT and a standard liquid crystal.

Typically, the time Tc-Tg must be greater than or equal to $\tau_1$ (cf. FIG. 4), during which time a voltage greater than $V_c$ must be maintained in order to break the anchoring, typically $\tau_1$≈1 ms. With Tg=20 µs and Tc-Tg=$\tau_1$, 50 other rows may be addressed during the phase of breaking one row.

The electrical parameters involved during the sustaining of P1 are: the capacitance of the pixel $Cpx=C_{LC}+C_S$, the resistance $R_{LC}$ of the latter and, possibly, $R_F$ if a leakage resistance is added as described in option 2.

3. ES Phase of Duration Tg': Establishment of the Texture Select Signal

As in the case of passive multiplexing, it is the switching to the T texture that is most tricky, since a rapid fall, in a time Tt, from P1f>$V_c$ to P2T is needed. Typically Tt is around 30 µs, i.e. of the order of magnitude of the gate open times. To optimize the rate, it is beneficial to take Tg'≦Tt≈30 µs. The condition for the voltage to fall from P1f to P2T in a time of the order of Tg is overall equivalent to that of the EC phase: the constraint on the TFT is similar. The electrical parameters involved during the ES phase are the same as in the case of the EC phase.

4. A Fall to Zero of the Select Signal takes Place Either Via a Third Transition, with Resetting to Zero (in the Case of Option 1), or by the Voltage Leakage at the Terminals of the Pixel (in the Case of Option 2).

Production of Grey Levels in an Active BiNem

It is possible to produce grey levels in active BiNem mode according to the present invention by creating, within a pixel, microdomains of T and U textures, the size and the density of which are controlled (cf. document [6]). Control is achieved by precisely controlling the voltage P2 of the second level (during the S phase of the addressing).

It will be worthwhile referring to document [6] for the implementation of such a process.

This process will therefore not be described in detail hereafter.

However, it will be recalled here that grey levels may be controlled by control means capable of producing, after anchoring breaking, mixed textures in which the bistable textures coexist in a controlled proportion within one and the same pixel, these textures being separated by 180° disclination lines volumewise or by 180° reorientation walls on one of the surfaces, and means for the long-term stabilization of the mixed textures by transformation of volume lines into surface walls and immobilization of these walls on the surface.

Obtaining a Zero Mean Value

The active BiNem may be switched with signals of positive or negative polarity.

In addition, as during, passive multiplexing, problems of certain liquid-crystal materials degrading by electrolysis may arise when they are subjected to a DC voltage. One solution for remedying this difficulty may consist in applying a signal of zero mean value to the liquid crystal. A signal with a zero mean value may be obtained by reversing the sign of the voltages applied to the columns from one frame to another.

Exemplary Embodiments According to the Invention

Two complete simulations of the addressing of an active BiNem screen according to the invention (the aforementioned options 1 and 2) were carried out using commercial software so as to validate the critical steps of the addressing according to the two options. The parameters common to these two simulations were:

Size of the Pixel:
 square pixel: $W_{LC}=L_{LC}=210$ µm;

Thickness of the Cell:
 d=1.5 µm;

Characteristics of the Screen:
 Rate: 50 Hz, i.e. a frame time of 20 ms;
 480 rows and 640 columns (VGA resolution)-available row time: 40 µs;

Characteristics of the Liquid Crystal:
 $C_{LC}=\epsilon_0\epsilon_{LC}W_{LC}L_{LC}/d$;
 $\epsilon_0$: permittivity of free space;
 $\epsilon_{LC}$: relative permittivity of the liquid crystal.

To take account of the dielectric anisotropy of the liquid crystal, we have considered an $\epsilon_{LC}$ of 5 in the case of the planar-homeotropic transition (charging of the capacitor in the EC phase) and an $\epsilon_{LC}$ of 25 for the homeotropic-planar transition (discharging of the capacitor in the ES phase).

Resistivity of the liquid crystal: $10^{10}$ Ω.cm. This liquid crystal is of moderate quality as regards resistivity (LCs used in standard TFTs possess a higher resistivity, of around two orders of magnitude, i.e. $10^{12}$ Ω.cm)

Characteristics of the TFT (Corresponding to a Standard TFT Made of a-Si of the Current Prior Art):

In our model, a TFT is characterized by the following parameters:
 CM=insulation capacitance per unit area: 30 nF/cm$^2$;
 $\mu_0$=mobility: 0.4 cm$^2$/V.s;
 W=width of the TFT: 20 µm;
 L=length of the TFT: 4 µm; and
 $C_S$=storage capacitance=$2C_{LC}$ (defined with $\epsilon_{LC}$=5, see characteristics of the liquid crystal).

These parameters allow the on mode ($R_{on}$) to be modelled.

Row Voltage (Applied to the Gate)

The row voltage is 30 V, with Tg=Tg'=Tg"=20 µs and Tc=Ts=1 ms.

FIG. 17 shows the row address voltage corresponding to option 1, comprising three pulses of respective duration Tg, Tg' and Tg".

FIG. 18 shows the row address voltage corresponding to option 2, comprising two pulses of respective duration Tg and Tg'.

Characteristics of the Metal Signal-Transporting Tracks:
 $R_{ct}$ (track): 0.1Ω; width=$l_t$: 5 µm.

The voltage at the terminals of the pixel is calculated from the last row so as to take into account the influence of all the parasitic coupling during propagation of the signal along the column.

Exemplary Embodiment of the Invention According to Option 1

With this option, three transitions Tg, Tg' and Tg" are needed, i.e. an overall row address time of 3×20 µs=60 µs. At 50 Hz, it is therefore possible to address 333 rows, with gate open times of 20 µs. To increase the number of rows, it is possible to reduce the Tgs, that is to say to increase the performance of the TFT and of the liquid crystal in order to charge to P1 (EC phase) in a shorter time Tg and to discharge from P1 (ES phase) in a shorter time Tg'.

Column Voltages:
 a breaking voltage $V_{col}$=25 V is applied for the time Tg=20 µs, synchronized to the first address pulse coming from the row, the objective being the charging of the pixel to the chosen breaking voltage P1i of 20 V in 20 µas; and
 then, after a time Tc of 1 ms, synchronized to the second address pulse coming from the row, the following are applied:
 in the case of switching to the T state: a zero select voltage for a time Tg' of 20 µs, the objective being to pass from the voltage P1f to a voltage P2T, which must be less than 5 V (in the case of P2U, between 7 and 9 V, as explained above with regard to multiplexing the BiNem) in a time of less than Tt (around 30 µs), in this case equal to 20 µs;
 in the case of switching to the U state: a select voltage, of 8 V for example, for a time Tg' of 20 µs, the objective being to pass from the voltage P1f to a voltage P2U, typically 8 V, in about 20 µs; and
 then after a time Ts, synchronized to the third address pulse coming from the row, a zero resetting voltage is applied for Tg" 20 µs independently of the texture.

Results of the Simulations:

FIG. 19 shows the calculated signal at the terminals of the pixel for switching to the T state. The signal generated is of the square-wave type as illustrated in FIG. 2. This shows that the charging of the pixel takes place correctly—a voltage slightly above 20 V is reached in 20 µs. Discharging between this same voltage (very little leakage in the case of this "standard" TFT) and a value very close to 0 V also takes place in 20 µs. This signal is therefore completely compatible with switching to the T texture.

FIG. 20 shows the calculated signal at the terminals of the pixel in the case of switching to the U state.

By three addressing steps, a two-level signal of the same type as that used for multiplexing is generated and allows switching to the U state.

The control signals for switching to the T and U states are 0 V after 2 ms. The switching mechanism during the next frame is therefore not disturbed.

A TFT with higher leakage can also be used for this option, provided that:
- P1 is maintained above $V_c$ throughout the entire C phase (typically 1 ms); and
- no parasitic signals whose RMS value is greater than the threshold voltage or Fredericks voltage (around 0.5 V) are sent to the pixel.

Exemplary Embodiment of the Invention According to Option 2

With this option, two transitions Tg and Tg' are needed, i.e. an overall row address time of 2×20 µs=40 µs. It will be possible to address 480 rows with Tg=Tg' 20 µs.

By way of non-limiting example, a discharge resistor RF of 150 MΩ was chosen and corresponds to a discharge time of 10 ms for the maximum capacitance of the liquid crystal.

Column Voltages:
- a breaking voltage $V_{col}$=25 V is applied for the time Tg=20 µs, synchronized to the first address pulse coming from the row, the objective being the charging of the pixel to the chosen breaking voltage P1$i$ of 23 V in the time Tg; and
- then, after a time Tc of 1 ms, synchronized to the second address pulse coming from the row, the following are applied:
- in the case of switching to the T state: a zero select voltage for a time Tg' chosen equal to Tg, the objective being the discharging from the voltage P1$f$ to a voltage P2T, which must be less than 5 V, in a time of less than Tt (around 30 µs), in this case equal to 20 µs;
- in the case of switching to the U state: a select voltage of 18 V for example, for a time Tg'=20 µs, which corresponds to a voltage P2U such that the falling time via the discharge resistance is less than the frame time of 20 ms.

In addition, this value allows a continuously falling signal to be generated.

There is no resetting of the pulse to zero, and it is therefore the leakage at the terminals of the pixel that must allow resetting to 0 over the duration of the frame time TRA. This resetting to zero is necessary for the next frame, since a non-zero start voltage would disturb the elastic coupling and the hydrodynamic coupling, and therefore the switching.

Figure 21A:
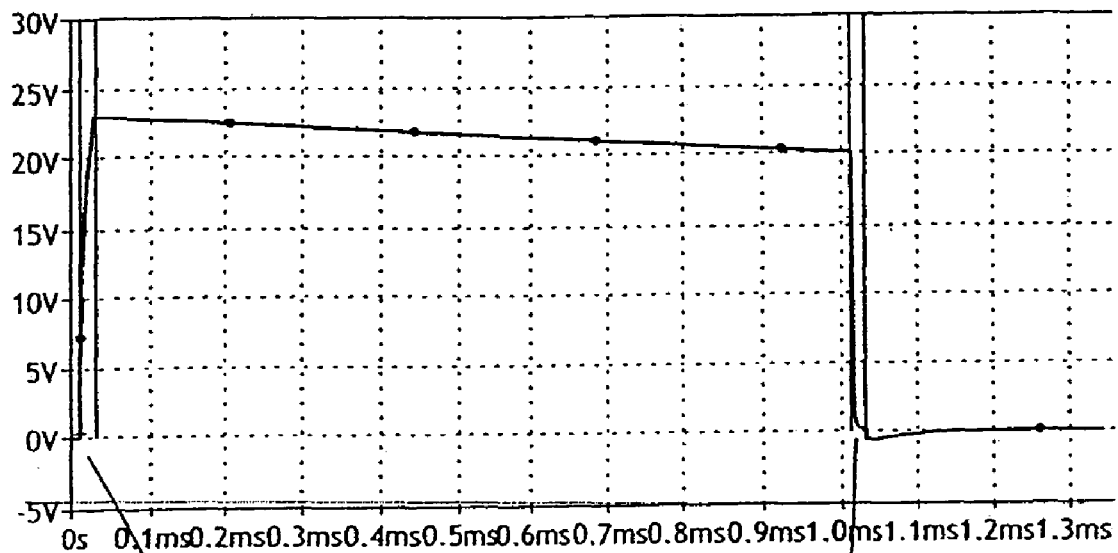
Figure 21B:
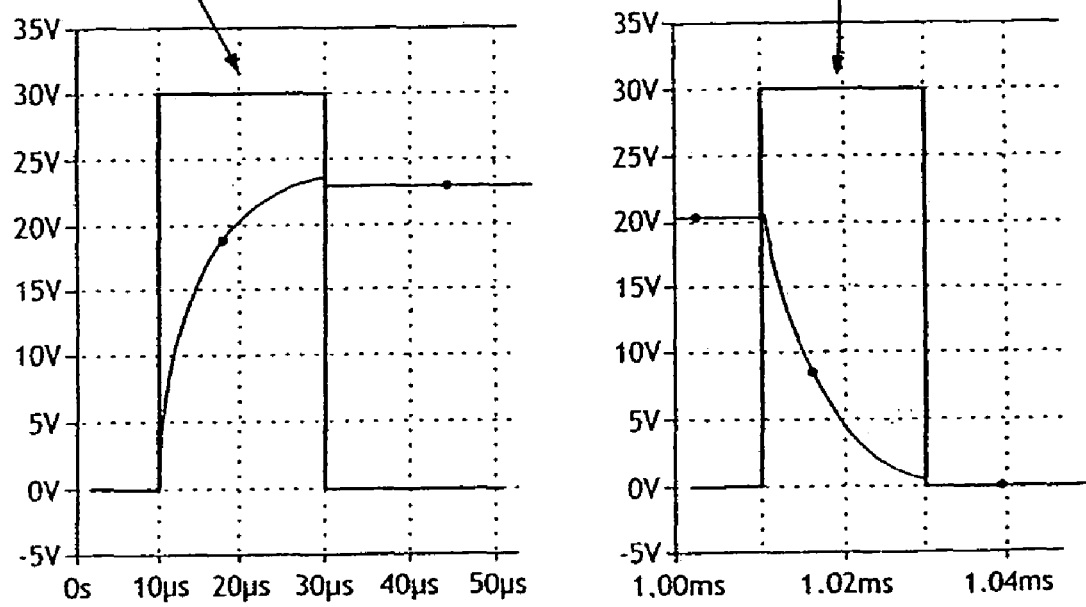

Results of the Simulations:

FIG. 21 shows the calculated signal at the terminals of the pixel in the case of switching to the T state.

The signal generated is of the square-wave type as illustrated in FIG. 2. This shows that the charging of the pixel takes place correctly. A voltage of 23 V is reached in 20 µs. The discharge resistor generates a voltage drop of 3 V in 1 ms. The voltage P1$f$ is therefore 20 V (a fixed limit so that P1>$V_c$≈16 V) The discharge between 20 V and a voltage very close to 0 V also takes place in 20 µs. This signal is therefore completely compatible with switching to the T texture.

Figure 22:
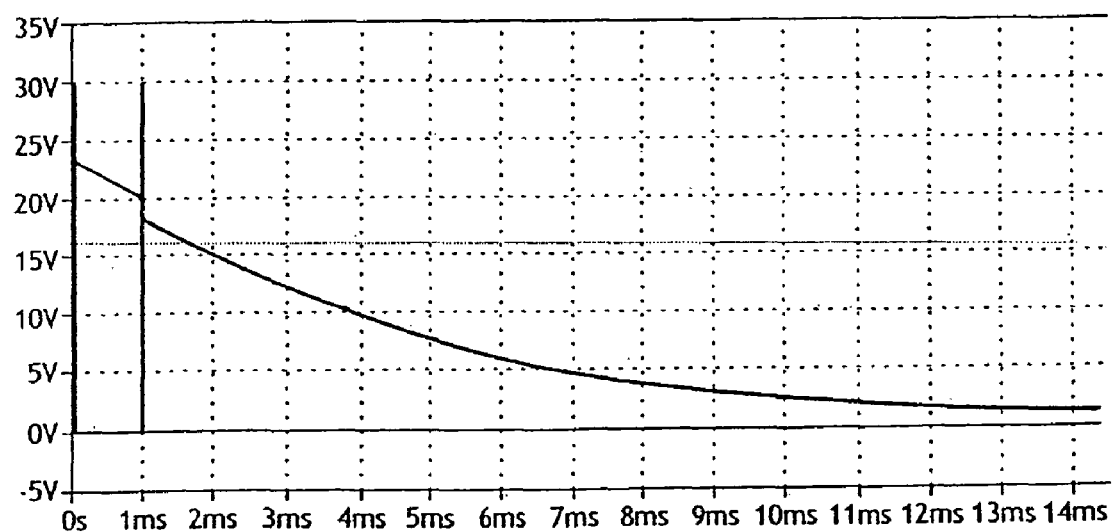
FIG. 22 shows a view similar to FIG. 21a for a simulated pixel signal for switching to the U texture.

FIG. 22 shows the calculated signal at the terminals of the pixel in the case of switching to the U state.

The signal generated is of the continuous slope type, as illustrated in FIG. 3. This shows that the charging of the pixel takes place correctly. A voltage of 23 V is reached in 20 µs. The discharge resistor generates a voltage drop of 3 V in 1 ms. The voltage P1$f$ is therefore 20 V (a fixed limit so that P1>$V_c$≈16 V) (idem switching to the T state). The discharge resistor therefore causes the voltage at the terminals of the pixel to decrease continuously. The decrease down to 3 V takes place in 10 ms and a voltage of 0.45 V (close to the Fredericks voltage) is reached in 20 ms—a value chosen for the frame time.

The control signals for switching to the T and U states are very close to 0 V after 2 ms and 20 ms respectively. The switching mechanism during the next frame is therefore undisturbed.

ADVANTAGES OF THE INVENTION

Operation in Fixed Image Mode: Bistability and Optical Quality of the BiNem

When the screen is not being addressed and displays a fixed image, the properties of the image are those of the BiNem. The bistability allows this displayed image to be sustained without any supply of energy, unlike standard liquid crystals that need to be permanently refreshed at a frequency of at least 50 Hz, resulting in increased power consumption of the screen. The planar character of the U and T textures (no molecules inclined to the plane of the substrate) makes it possible to achieve good optical quality (contrast, brightness) of the image at a high viewing angle without the addition of birefringent compensation films, as is the case with the TN or MVA effect.

Contribution of Selective Addressing: the Optical Quality of a Fixed Image is Partly Maintained in a Moving Image When only the pixels whose state is modified between two frames are selectively addressed, that part of the image which is not re-addressed is stable. It has a quality equivalent to that of a fixed image and gives the observer a good overall visual impression. The pixels that switch are only disturbed during the time needed to switch to the T state or to the U state, i.e. about 5 ms. The contrast and brightness of the screen will therefore be optimum. The transition of a pixel via intermediate switching states does not appear at each frame, but only when this pixel changes state.

Contribution of Selective Addressing: Reduction in Power Consumption

At each change of image, although all the TFTs of an addressed row receive a gate open signal simultaneously, only the pixels that have to change state will receive a control signal, via the drain of the associated TFT. In the case of the other pixels, that is to say those for which a change of state is not desired, the sources and drains of the associated TFTs will remain at zero potential. The power consumption will thus be markedly reduced, even to zero in the case of slowly varying images.

Contribution of the TFT: Isolation of the Pixel

The transistor coupled to each pixel acts as a switch, which is closed for a short time (from about ten to a few tens of µs) when charging the data, and which is open for the rest of the frame time. Each liquid-crystal pixel is thus isolated from the other pixels and from the column data that travel along the column tracks. No flicker effect appears when addressing an image, without any limit as regards the number of pixels addressed.

Contribution of the TFT: Increase in the Address Rate

The row address time for the active BiNem is, depending on the option adopted, about 2 or 3 times the gate open time Tg, typically a few tens of µs, compared with the time needed for multiplexed addressing, which is typically around 1 to 2 ms. Thus, an increase in accessible rate by a factor of about 50 is achieved with the active BiNem according to the present invention compared with passive multiplexing. As in the case of standard liquid crystals addressed by TFTs, addressing 1000 rows at a video rate is therefore possible in active BiNem mode according to the present invention.

Contribution of the TFT: Better Propagation of Signals Along the Row

In a TFT screen, the signal is transported by very fine metal tracks between the pixels of width $l_p$. Propagation along these rows takes place according to the diffusion equation, as in the case of ITO tracks, but the surface resistance of these tracks is ≅0.1Ω, i.e. 100 times lower. The diffusion time is thus reduced by a factor of one hundred for the same screen. It arises only in the case of screens whose columns are ten times longer.

The metal column track charges only one pixel at a time, but it is narrower than the pixel. These effects partly compensate for each other. The conductivity of the metal allows the charging time due to the resistance of the track to be neglected. For a square screen of size L=85 mm, the pixels of which are square with sides of L/n, the ratio of the diffusion time $T_d$ to the charging time $T_c$ for a metal track of width $l_p$ is, for 400 square pixels with sides of 210 µm:

$$T_d / T_c = (R_{s(ITO)} / R_{s(metal)})(n^2 l_p / L)$$

$$\cong (15 / 0.1) \times (400 \times 400 \times 5 \ \mu m / 85 \ mm)$$

$$= 1400.$$

Thus, it may be seen that there is no limitation as regards deformation of the falling edges of the column signal by the $R_s$ of the track during propagation along the column.

It is the resistance of the TFT in the on state that determines the capability of voltage charging and discharging (EC and ES phases) in a sufficiently short time.

Technological Aspect: Specification of the TFT

The above simulations show that the use of a standard TFT is compatible with the invention according to option 1 (application of address and control signals during three successive phases spaced apart in time, Tg, Tg' and Tg") for binary switching between the U and T states.

The switching of the BiNem depends on the waveform of the signal applied and particularly on the waveform of its falling edge. The value of the resistance $R_{on}$ of the transistor must therefore allow a charging or discharging time of less than 30 µs. This can be easily achieved with a standard mobility (cf. simulations). To increase the resolution and the rate of an active BiNem screen according to the present invention, it is possible to use a transistor that allows more rapid charging and discharging of the pixel voltage so as to reduce the gate open times Tg, Tg' and Tg". This is achieved, for example, with a TFT of greater mobility $\mu_0$ than that chosen for the simulation, or with a shorter transistor (shorter channel length), since $R_{off}$ is not critical.

As regards the resistance $R_{off}$ of the transistor, this is involved as it transmits, to a given pixel, the column signal from the other pixels attenuated by the $R_{off}C_{tx}$ filter. It should be pointed out that the constraint on $R_{off}$ is in this case much less than in the case of the TFTs for conventional displays, since all that is required is for the parasitic signal to be below the Fredericks voltage (0.5 V) so that there is no action on the pixel outside the switching times. During the breaking time Tc, the constraint does not exist since all that is required is to increase P1 slightly in order for their to be no risk of this parasitic signal causing the voltage of the pixel to drop below $V_c$. It is therefore possible to use, for the two options (application of address and control signals of the three successive phases spaced apart in time Tg, Tg' and Tg" or application of the address and control signals over two successive phases spaced apart in time Tg and Tg') a "degraded" transistor for which a lower $R_{off}$ is tolerated, that is to say one with greater leakage. In this case, some of the constraints on the TFT parameters are lifted.

For the same reason, the tolerance on the resistivity of the liquid crystal is greater than in the case of a TFT associated with a standard liquid-crystal effect. A lower liquid-crystal resistivity is permitted in the case of the active BiNem according to the present invention.

The use of addressing option 2 (two-transition addressing) recommends, for optimized operation, the addition of a discharge resistance $R_F$ at the terminals of the liquid crystal.

Conventionally, a storage capacitor $C_S$ put into standard TFTs is used to screen the interfering signal that would cause a variation in the voltage at the terminals of the liquid crystal. Since the constraint on maintaining the voltage is much less severe in the case of the active BiNem according to the present invention, it is conceivable, in the design of an optimized TFT for a BiNem application, to reduce or even eliminate this storage capacity $C_s$.

The switch function fulfilled by the transistor may also be fulfilled by a system based on one or two diodes, as illustrated in FIGS. 23 and 24. The rows 46 and the columns 45 are each on one face of the cell (technology simplification). The columns 45 may be produced by a conventional ITO track on a first plate. The second plate includes ITO pads 47, placed opposite the columns 45 in order to define the pixels. Moreover, the second plate carries diodes 100 placed respectively, for each pixel, between a row 46 and an associated pad 47. The direction of each diode 100 depends on the polarity of the signals applied between rows and columns. The diodes are positioned so as to operate "in reverse mode", that is to say to allow a signal current to flow when they receive a reverse voltage of greater than their Zener voltage $V_Z$. The absolute value of this Zener voltage $V_Z$ is chosen to be greater than the absolute value of P1.

For a positive voltage applied to the columns 45 and a negative voltage applied to the rows 46, the diodes 100 have their anode on the row 46 side and their cathode on the pads 47 side, and therefore on the column 45 side.

With regard to FIG. 23:

to control the pixel defined at the intersection of row 1 (46) and column 45, a voltage $-V_Z$ is applied to the row 1 and a positive voltage P1 is applied to the column 45. The corresponding pixel sees a voltage P1 at its terminals because of the voltage drop of absolute value $V_Z$ at the terminals of the diode 100;

the pixel defined at the intersection of row 2 (46) and the same column 45 is not controlled. This is because, since row 2 is at 0 volts, the associated diode 100 sees a voltage P1 below its Zener voltage $V_Z$ and remains off.

The characteristic of the diode 100 is illustrated in FIG. 25.

A system based on two back-to-back diodes 100, 102, as illustrated in FIG. 24 (see the characteristic in FIG. 26), allows a similar operation with a bipolar switching signal.

REFERENCES

Doc [1]: Patent FR 2 740 894;
Doc [2]: PM Alt and P. Pleshko, IEEE Trans Electron Devices ED-21, 146-55, 1974;
Doc [3]: Patent FR 0 204 940;
Doc [4]: Patent FR 0 201 448;
Doc [5]: C. Joubert, SID Proceedings, 2002, pages 30-33;
Doc [6]: Patent FR 2 824 400.

The invention claimed is:

1. Method for electrically controlling a bistable nematic liquid crystal matrix screen composed of pixels provided in a matrix of rows and columns, comprising a liquid crystal layer between two substrates facing each other, two sets of electrodes placed respectively on the substrates, each pixel having two electrodes forming respectively a drive pixel electrode and a back pixel electrode, the drive pixel electrode being connected to the crossing of one row and one column on one substrate, the back pixel electrode being provided on the other substrate, an array of row conducting tracks and of column conducting tracks, and an array of transistors respectively associated with each one of the pixels, said liquid crystal matrix screen including a weak zenithal anchoring orientation layer on one of the substrates, each pixel of the bistable nematic liquid crystal matrix screen being addressed via a respective transistor, each transistor comprising a gate, a source and a drain, each transistor being activated by sequentially scanning the row conducting tracks of the screen, the gate of each pixel transistor being connected to a respective row conducting track, the gate controlling the turning-off or turning on of the transistor by applying address signal, the source of each pixel transistor being connected to a respective column conducting track, the source applying control signal, the drain being connected to the drive pixel electrode, said bistable nematic liquid crystal matrix screen comprising two bistable liquid crystal textures, one texture being uniform or slightly twisted wherein the liquid crystal molecules being at least approximately parallel to one another, and the other texture differing from the first texture by a twist of about +180° or −180°, said electrically controlling consisting in switching each pixel between the two bistable liquid crystal textures, the method comprising successively in time a first phase, an intermediate phase, and at least one texture control phase, the first phase comprising:
applying to the gate of the transistors of respective pixels corresponding to a common row, via said corresponding row conducting track, an address signal in order to turn on the transistors of the common row, allowing the control signals applied to the source of the same transistors in synchronism with the address signal to appear on the drain of said transistors and consequently on the associated drive pixel electrodes, said control signals having a sufficient amplitude to permit breaking of the anchoring of the liquid crystal on said pixels, and then applying to the gate of the transistors of said common row, an address signal in order to turn off the transistors, the intermediate phase having a controlled time interval which is sufficient and adapted to break the anchoring of the liquid crystal of the said pixels and wherein several other rows are addressed during said intermediate phase, the at least one texture control phase comprising:
applying again to the gate of the transistors of said respective pixels corresponding to said common row, an additional address signal in order to turn on again the transistors allowing the control signals applied to the sources of said transistors in synchronism with the address signal to appear on the drain of said transistors and consequently on the associated drive pixel electrodes, said control signals being applied in order to select the final bistable liquid crystal texture, then applying to the gate of the transistors of said common row, an address signal in order to turn off the transistors.

2. Method according to claim 1, wherein the steps of controlling switching each pixel between the two bistable liquid crystal textures comprise a sequence made up of a first phase and a single texture control phase, the first phase and the texture control phase being separated by an intermediate phase.

3. Method according to claim 1 wherein a discharge resistor is provided respectively at the terminals of each pixel.

4. Method according to claim 1, wherein the steps of controlling switching each pixel between the two bistable liquid crystal textures comprise a sequence made up of a first phase and two texture control phases, the first phase and the texture control phases being separated by two respective intermediate phases.

5. Method according to claim 4, wherein said sequence comprises:

the first phase comprising:
applying to the gate of the transistors of respective pixels corresponding to a common row, via said corresponding row conducting track, an address signal in order to turn on the transistors of the common row, allowing the control signals applied to the source of the same transistors in synchronism with the address signal to appear on the drain of said transistors and consequently on the associated drive pixel electrodes, said control signals having a sufficient amplitude to permit breaking of the anchoring of the liquid crystal on said pixels, and then applying to the gate of the transistors of said common row, an address signal in order to turn off the transistors, a first intermediate phase having a controlled time interval which is sufficient and adapted to break the anchoring of the liquid crystal of the said pixels and wherein several other rows are addressed during said intermediate phase, a first texture control phase comprising:
applying again to the gate of the transistors of said respective pixels corresponding to said common row, an additional address signal in order to turn on again the transistors allowing the control signals applied to the sources of said transistors in synchronism with the address signal to appear on the drain of said transistors and consequently on the associated drive pixel electrodes, said control signals being applied in order to select the final bistable liquid crystal texture, then applying to the gate of the transistors of said common row, an address signal in order to turn off the transistors, a second intermediate phase having a controlled time interval, a second texture control phase comprising:

applying again to the gate of the transistors of said respective pixels corresponding to said common row, an additional address signal in order to turn on again the transistors allowing the control signals applied to the sources of said transistors in synchronism with the address signal to appear on the drain of said transistors and consequently on the associated drive pixel electrodes, said control signals corresponding to a reset to zero signal, and then applying to the gate of the transistors of said common row, an address signal in order to turn off the transistors.

6. Method according to claim 4, wherein the select control signals applied during the first texture control phase is zero or small, in order to obtain a twisted texture.

7. Method according to claim 1, wherein the steps of controlling switching each pixel between the two bistable liquid crystal textures comprise a sequence made up of a first phase and more than two texture control phases, the first phase and all the texture control phases being separated by respective intermediate phases.

8. Method according to claim 1, wherein the control signals are of square-wave type to obtain a twisted texture.

9. Method according to claim 1, wherein the intermediate phase is designed to control the variation of the falling edge of each control signal, to obtain a uniform texture.

10. Method according to claim 1, wherein the transistors have a degraded internal resistance in the off state.

11. Method according to claim 1, wherein the control signal is maintained at zero for the pixels whose state does not have to be modified.

12. Method according to claim 1, wherein the amplitude of control signals is adapted to obtain grey levels.

13. Method according to claim 1, wherein the amplitude of control signals is adapted to obtain, after anchoring breaking, mixed textures in which the two bistable textures coexist in a controlled proportion within one same pixel, these two textures being separated by 180° disclination lines volumewise or by 180° reorientation walls on one of the surfaces, and said method comprising the step of stabilization of the mixed textures by transformation of volume lines into surfaces walls and the immobilization of these walls on the surface.

* * * * *